(12) United States Patent
Stec

(10) Patent No.: US 10,663,751 B2
(45) Date of Patent: May 26, 2020

(54) GIMBAL ADJUSTMENT SYSTEM

(71) Applicant: FotoNation Limited, Galway (IE)

(72) Inventor: Piotr Stec, Claregalway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/184,071

(22) Filed: Jun. 16, 2016

(65) Prior Publication Data

US 2017/0363881 A1 Dec. 21, 2017

(51) Int. Cl.

| | |
|---|---|
| *G02B 27/64* | (2006.01) |
| *H02K 33/12* | (2006.01) |
| *G03B 5/04* | (2006.01) |
| *G03B 5/02* | (2006.01) |
| *H04N 5/232* | (2006.01) |
| *H04N 5/225* | (2006.01) |
| *G02B 7/00* | (2006.01) |

(52) U.S. Cl.
CPC ............ *G02B 27/646* (2013.01); *G02B 7/00* (2013.01); *G03B 5/02* (2013.01); *H04N 5/2253* (2013.01); *H04N 5/23258* (2013.01); *H04N 5/23287* (2013.01); *G03B 2205/0038* (2013.01); *G03B 2205/0069* (2013.01)

(58) Field of Classification Search
CPC .... G02B 27/64; G02B 27/646; G02B 27/648; G03B 2205/0007; G03B 5/02; G03B 5/04; G03B 5/06; H02K 33/12; H02K 33/14; H04N 5/23258; H04N 5/23248; H04N 5/23264; H04N 5/2328; H04N 5/23287
USPC ....... 359/554–557, 813, 814, 824, 874, 876; 396/55; 348/208.4, 208.5, 208.7, 208.11
See application file for complete search history.

(56) References Cited

U.S. PATENT DOCUMENTS

| | | | |
|---|---|---|---|
| 9,743,001 B1 | 8/2017 | Stec | |
| 9,934,559 B2 | 4/2018 | Stec | |
| 2006/0033818 A1* | 2/2006 | Wada | ..................... G03B 17/00 348/208.11 |
| 2010/0202766 A1* | 8/2010 | Takizawa | ................. G03B 5/00 396/55 |
| 2014/0125824 A1* | 5/2014 | Takizawa | ................. G03B 5/00 348/208.3 |

* cited by examiner

*Primary Examiner* — Marin Pichler

(57) ABSTRACT

In one embodiment, a gimbal adjustment system and an associated method for adjusting the position of an object. The system comprises a base, a plate and a shaft including a pivot attached to the plate. The pivot has a point of contact with the plate in a joint about which the plate is rotatable. Magnetic elements are positioned on the base and the plate to stabilize or rotate the plate. The object may be an optical unit attached to the plate. A combination comprising the plate, optical unit and magnetic elements may form a gimbaled assembly having a center of mass in the joint.

17 Claims, 23 Drawing Sheets

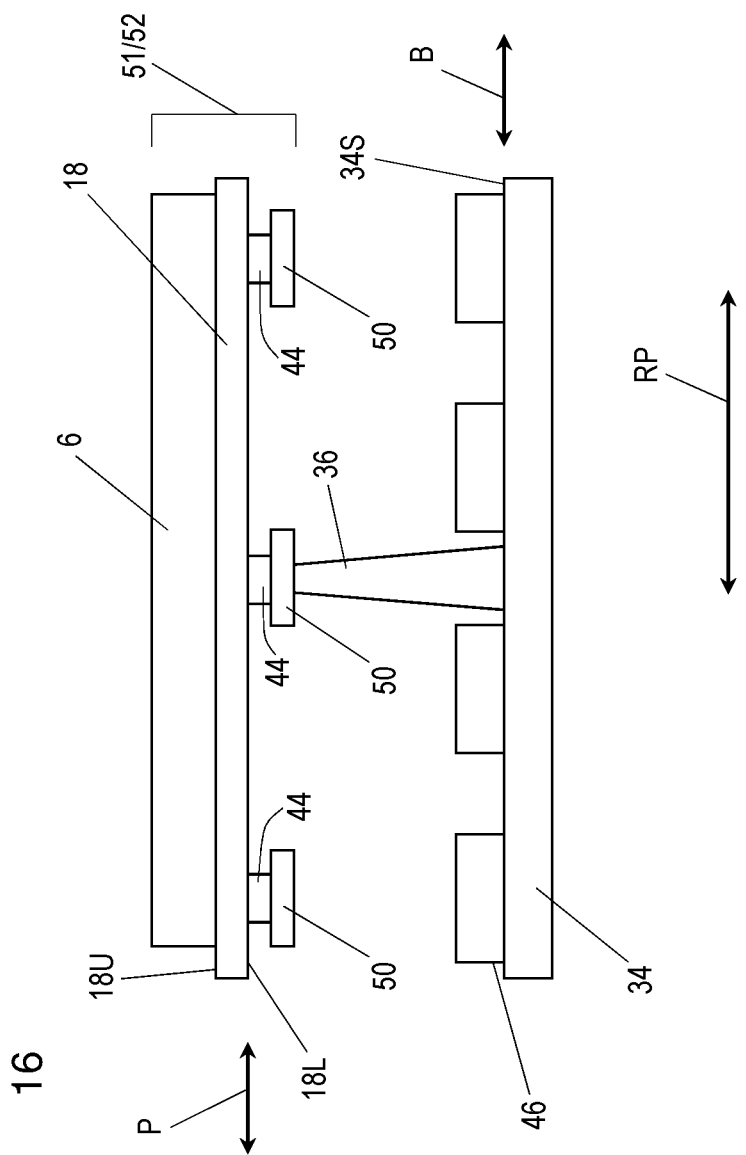

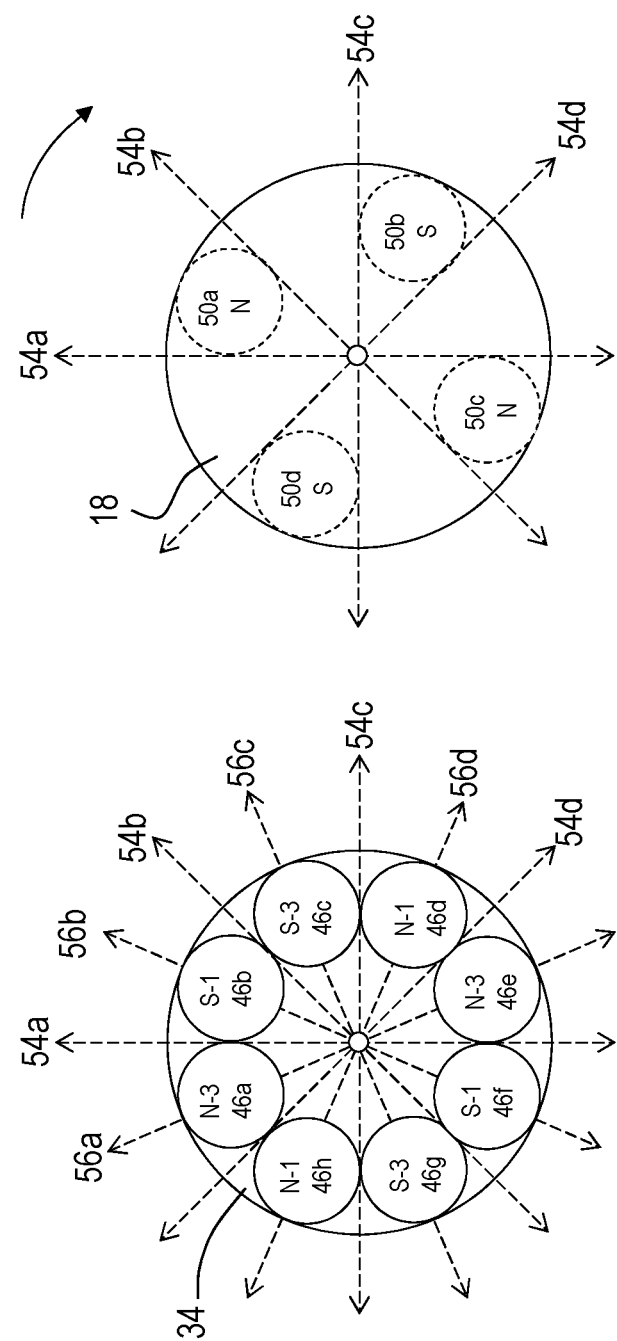

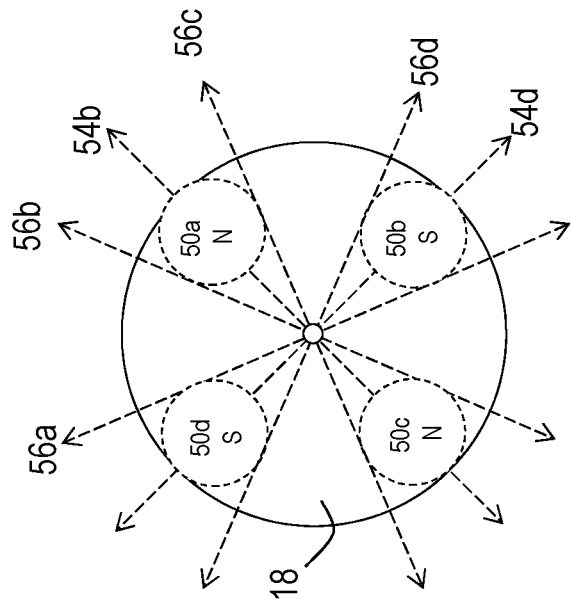
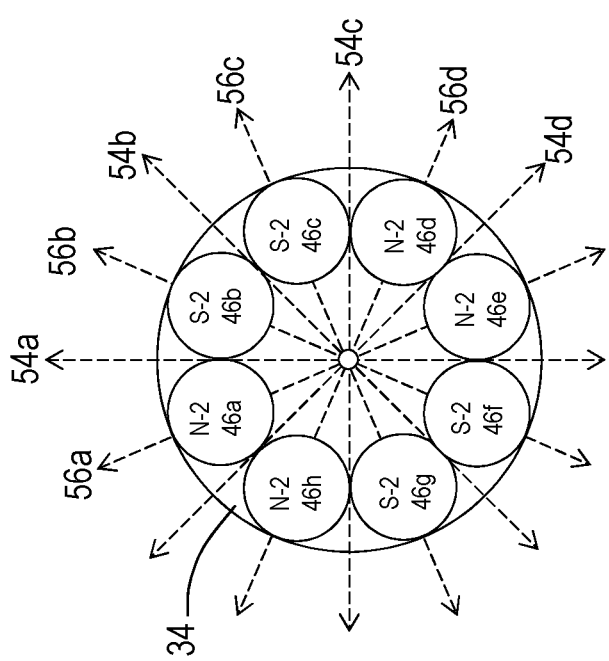
Fig. 6E
Fig. 5E

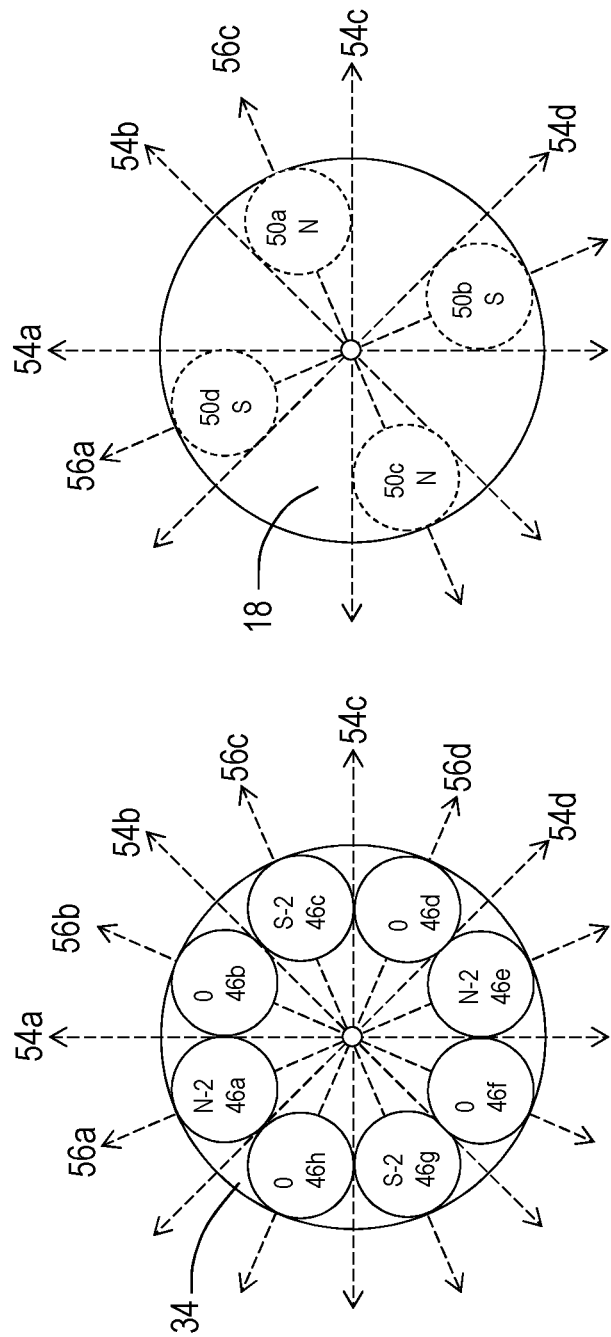

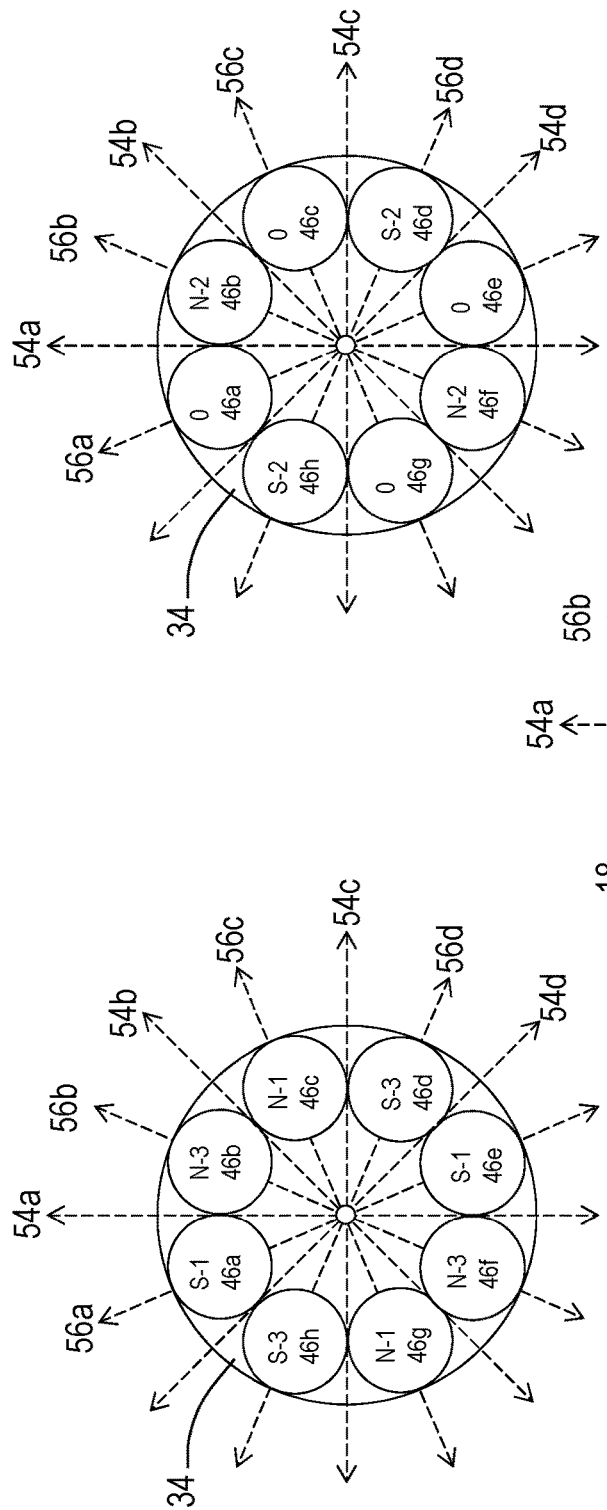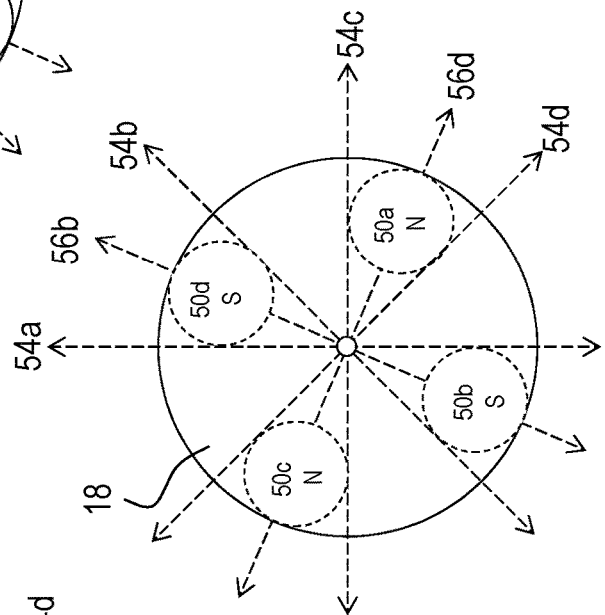

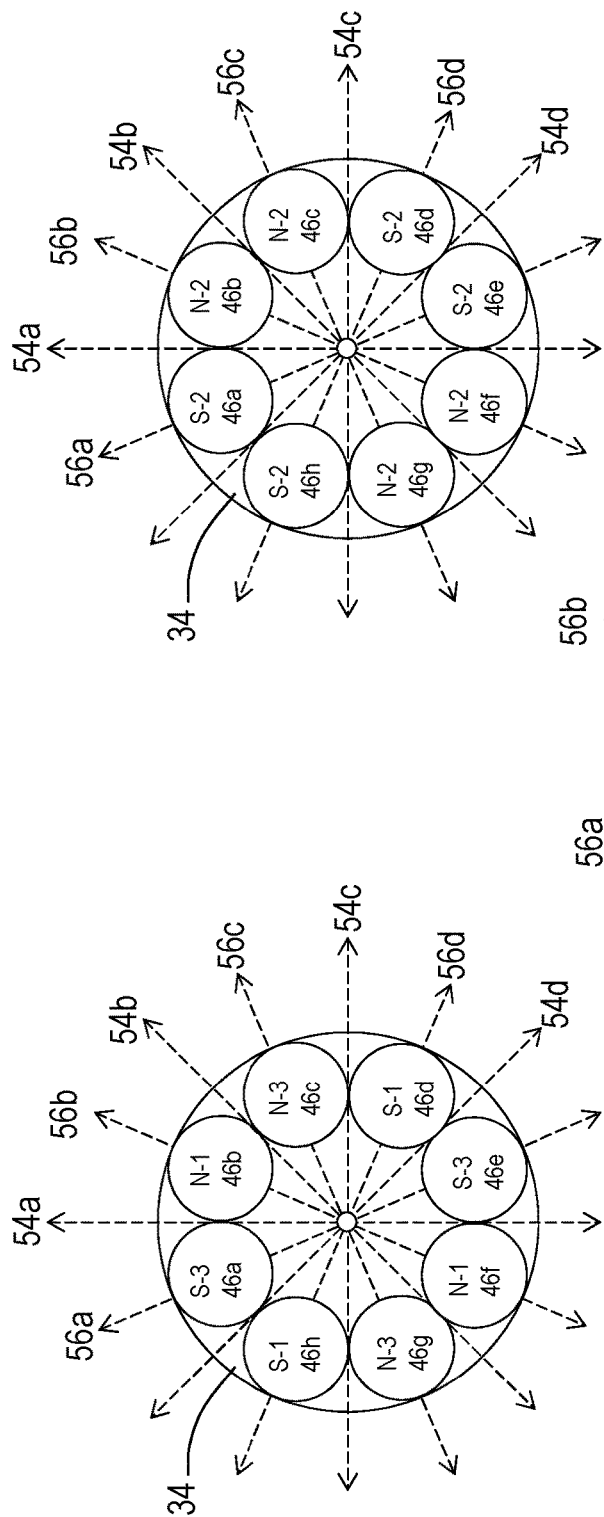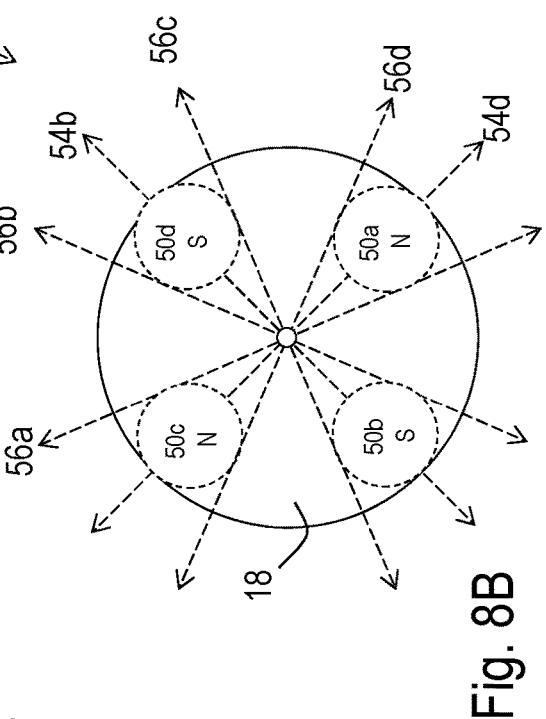

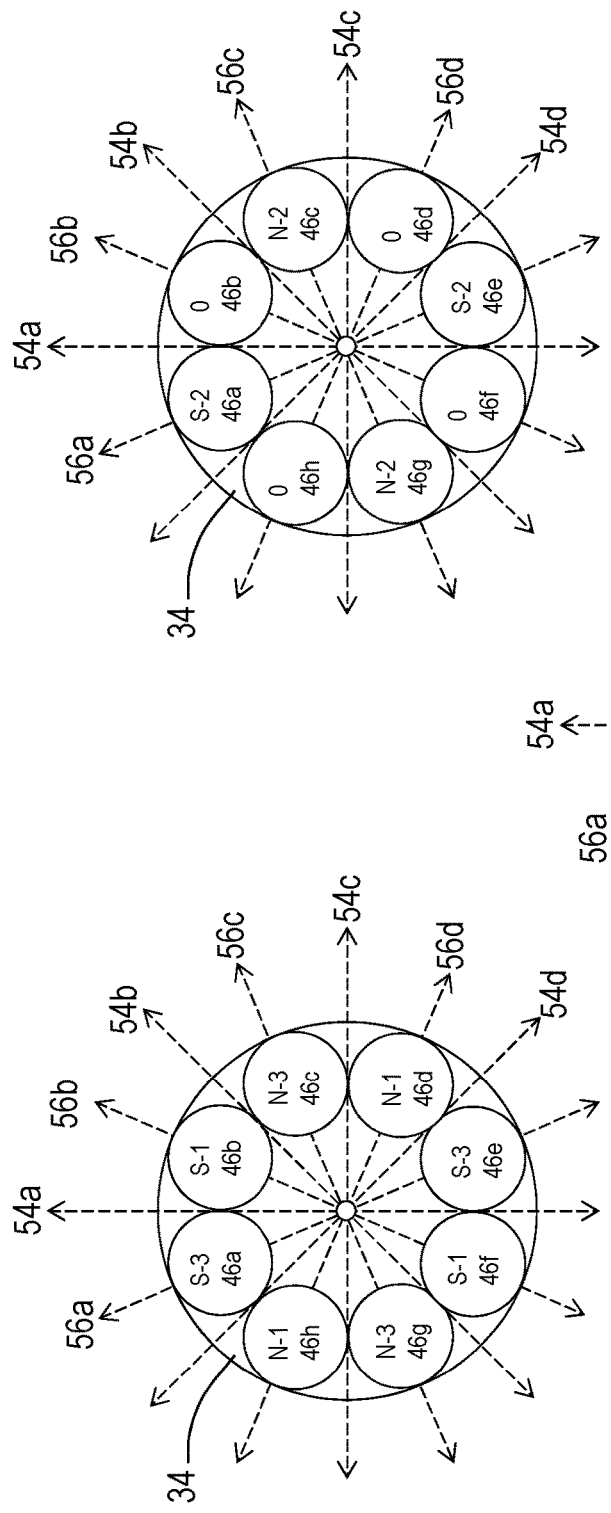
Fig. 7F
Fig. 7E
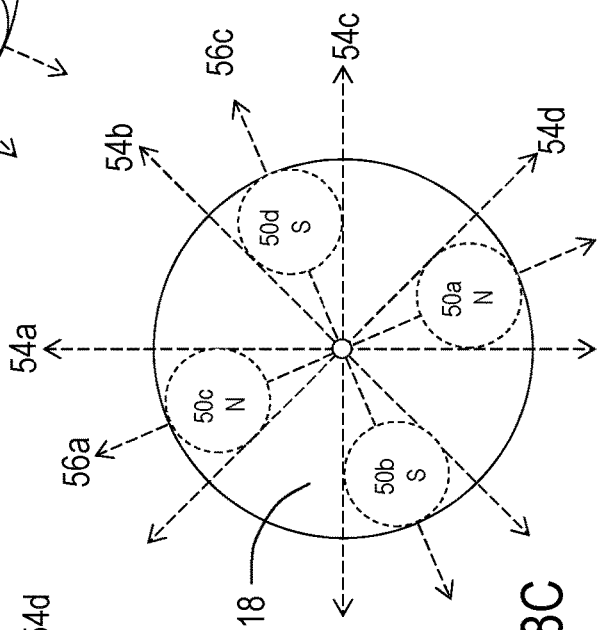
Fig. 8C

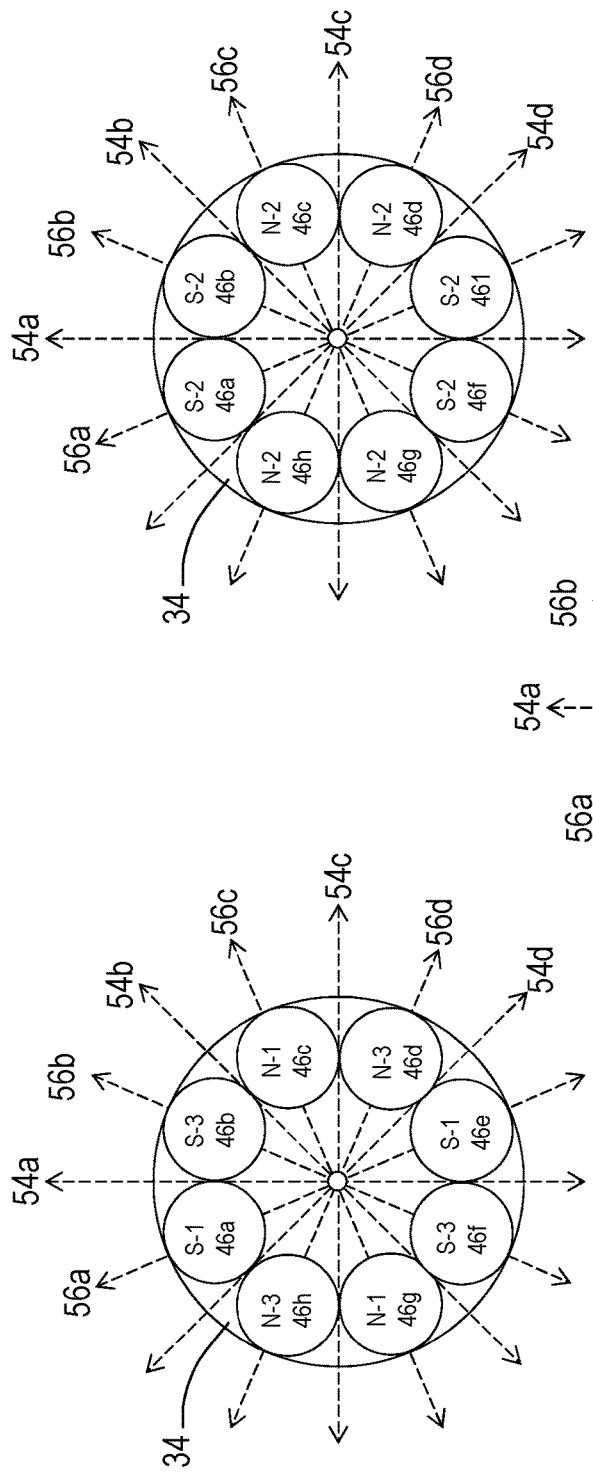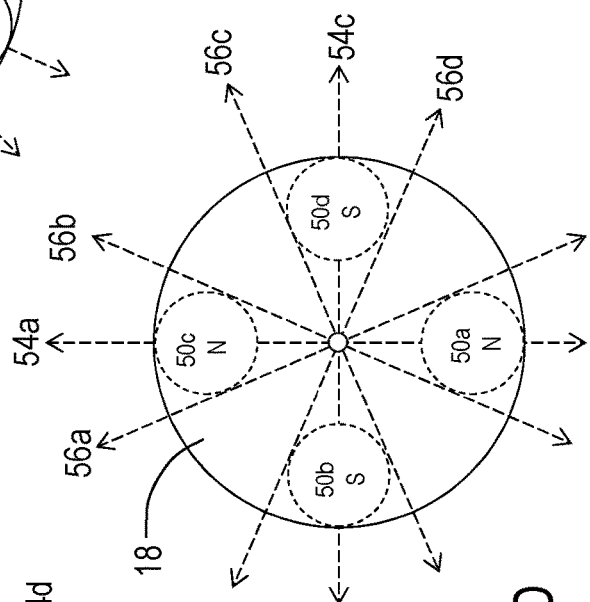

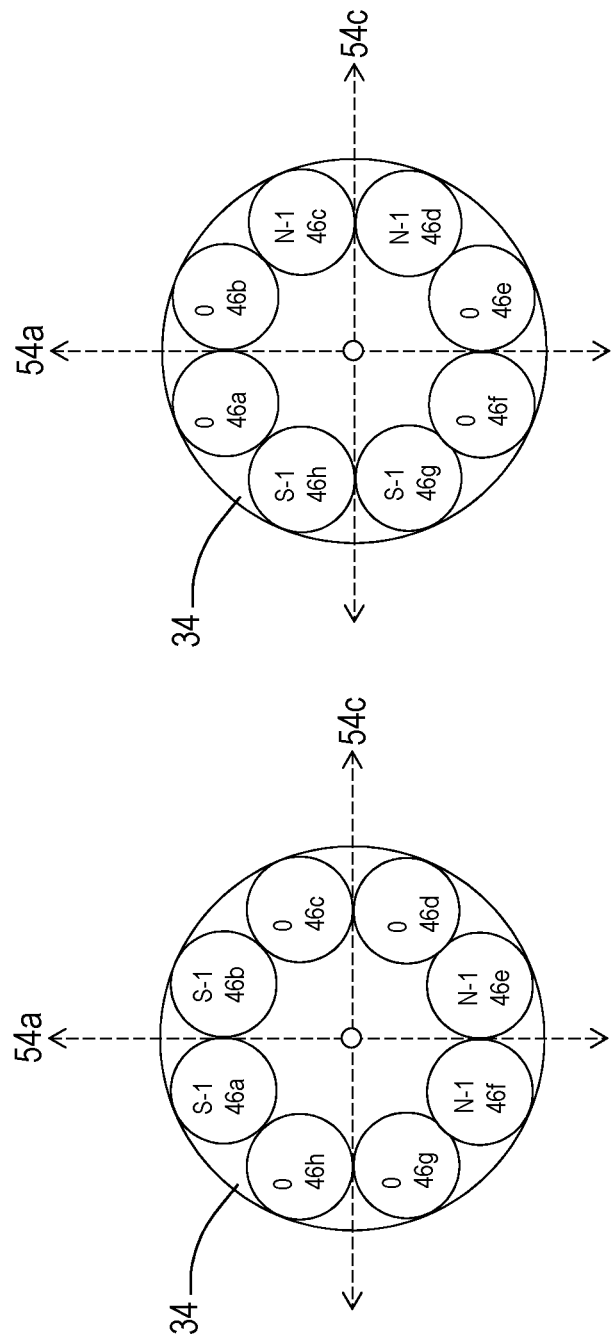

GIMBAL ADJUSTMENT SYSTEM

RELATED APPLICATIONS

This application is related to U.S. patent application Ser. No. 15/048,149, titled "A Method of Stabilizing a Sequence of Images" filed 19 Feb. 2016 and U.S. patent application Ser. No. 15/048,224, titled "A Method for Correcting an Acquired Image" filed 19 Feb. 2016, each assigned to the assignee of the present application and hereby incorporated by reference.

TECHNICAL FIELD

Systems and methods are described for controlled rotation of gimbaled objects. One series of embodiments relates to optical image stabilization based on controlled rotation of a gimbaled object such as an imaging device.

BACKGROUND OF THE INVENTION

Image Stabilization and Optical Image Stabilization (OIS) are used to stabilize still and video images, generally by modifying components in the optical path in order to offset effects of uncontrolled motion. The techniques can prevent blurring of images and effects of jitter. For many applications stabilization is provided by imparting movement to a lens or an image sensor during image acquisition. Compensating movement of the sensor may be referred to as mechanical stabilization. Techniques that stabilize image projection on a sensor, rather than providing corrections after conversion of image data into digital information are relevant to hand-held applications such as cameras integrated in smart phones.

In the past, image stabilization systems have used sensors to detect movement along a plane perpendicular to the optical axis and introduce compensating shifts to the lens or sensor by imparting movement along the plane. Typically these systems use piezo-electric sensors to sense rotational movements and apply magnetic actuation to impart a rotational shift in the plane to impart counter movement to the lens.

As described in co-pending U.S. application Ser. No. 15/048,149 (the '149 patent), OIS corrects for pitch and yaw rotations, and not for rotation along the optical axis. Resulting changes in perspective projection, caused by camera rotation, are not compensated for and the range of the correction provided by OIS is usually limited. When there is substantial camera movement the movement may not be fully compensated. This can create image distortion in an OIS corrected image. See FIG. 2(a) of the '149 patent.

While conventional implementations of OIS can provide significant reduction in image blur and movement, there is a continued need to develop further capability, particularly to address increased demand for high image quality in hand-held devices, e.g., smart phones. Given the physical size constraints of hand-held device formats it is a challenge to provide optimal benefits of OIS. It is desirable to provide OIS designs which have improved responsiveness to larger ranges and higher frequencies of uncontrolled motion. Also, because OIS functions have been designed to compensate for uncontrolled motion by shifting the lens barrel along a plane, to maintain object position relative to the image sensor, the OIS system corrects for pitch and yaw rotations about the optical axis. It is desirable to provide stabilization systems and methods which provide adjustments along three orthogonal directions of rotation.

BRIEF DESCRIPTION OF THE FIGURES

The following drawings are provided to facilitate understanding of the inventive concepts described in the written description which follows, where:

FIG. 3A is a side view of a gimbal adjustment system according to an embodiment of the invention showing the camera unit mounted on a gimbaled plate for controlled rotation about a central axis;

FIGS. 5A through 5I are plan views of an embodiment of the support base in the gimbal adjustment system, each providing a set of field coil specifications to generate motive forces in a multi-step sequence which rotates the gimbaled plate through a series of positions in a ninety degree range;

FIGS. 6A through 6I are plan views taken along an upper surface of the gimbaled plate to illustrate plate rotations which each result from a corresponding one of the FIGS. 5A through 5I, where corresponding ones of FIGS. 5A through 5I are each keyed to FIGS. 6A through 6I by including a like letter A through I in the figure number;

FIGS. 7A through 7H are plan views of the support base in the gimbal adjustment system, each providing a set of field coil specifications to generate motive forces in a multi-step sequence which rotates the gimbaled plate through a series of positions which extend the range from ninety degrees, as described in FIGS. 5 and 6, to 180 degrees;

FIGS. 8A through 8D illustrate exemplary 22½ degree increments of rotation generated with the field sets of FIG. 7, while

FIG. 9A is a plan view of the support base, specifying field coil settings that tilt the gimbaled plate along a first direction about the axis to provide the pitch rotation illustrated in FIG. 3C;

FIG. 9B is a plan view of the support base, specifying field coil settings that tilt the plate along a second direction about the axis to provide the roll rotation illustrated in FIG. 3D.

Like reference numbers are used throughout the figures to denote like components. Numerous components are illustrated schematically, it being understood that various details, connections and components of an apparent nature are not shown in order to emphasize features of the invention. Various features shown in the figures are not to drawn scale.

DETAILED DESCRIPTION OF THE INVENTION

Figure 1:
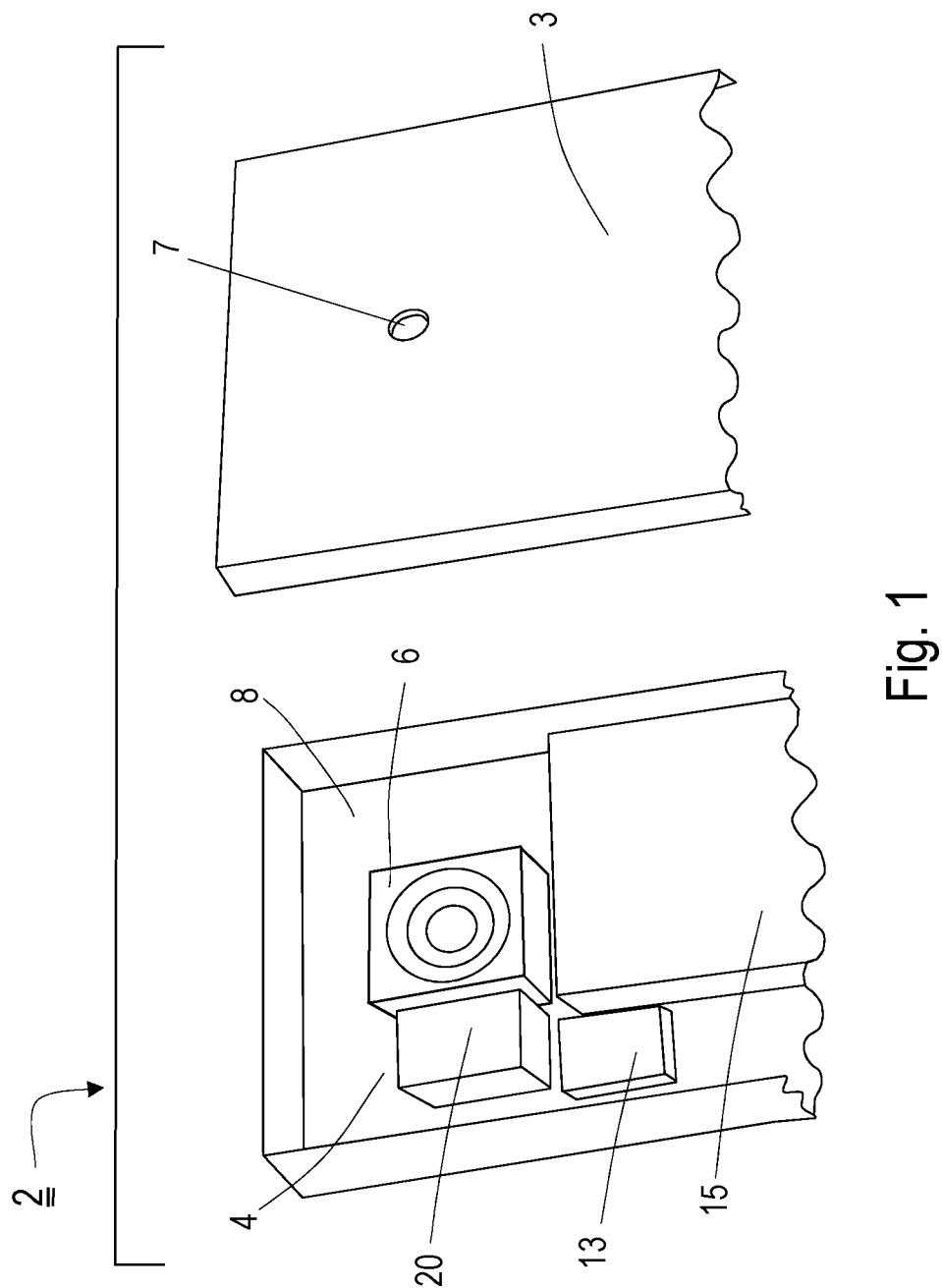
FIG. 1 is a partial perspective view of a handheld device showing an interior surface along which a camera unit is positioned on a gimbal adjustment system according to an embodiment of the invention.

FIG. 1 is a partial perspective view of a mobile handheld device 2, incorporating an embodiment of a camera adjustment system according to the invention. The illustrated handheld device is a mobile telephone, but may be a tablet computer or any other portable unit which provides digital still or video photography. A rear cover 3 of the device 2 is shown in spaced apart relation to the device body 4, providing an interior view of the device. The rear cover 3 includes an opening 7 through which a camera unit 6 receives imaging light. The camera unit 6 is mounted above an interior surface 8 of the device. Although not shown in FIG. 1, the camera unit 6 is attached to a gimbal adjustment system (shown in FIGS. 2 and 3), which is mounted on the interior device surface 8. Generally, the invention as described in the figures may be housed within handheld cameras, camera-equipped mobile phones or imaging devices mountable on tripod systems or on varied moving or stationary surfaces for imaging, photography, videography, monitoring or observation. Types of observation include security functions, remote monitoring and vehicle safety applications such as those providing drivers with adjustable rearward views.

Embodiments of the adjustment system provide stabilization to a variety of devices, including optical systems. The embodiment integrated within the handheld device 2 is an Optical Image Stabilization (OIS) system 4, generally illustrated in FIG. 2. The system 4 reduces effects of hand jitter and other uncontrolled motions during operation of the camera unit 6. OIS systems according to the invention may also be applied to stabilize images taken with other device types, including head-mounted cameras and cameras mounted on moving vehicles. When applied to optical imaging devices, the system 4 can reduce adverse effects on image quality or adjust the direction of the optical axis. More generally, the disclosed stabilization systems can reduce uncontrolled motion or adjust direction or orientation of any object including, for example, a lens system, a sensor or a pointing device.

In the illustrated example, a lens 10 and an image sensor 12 are mounted within an enclosure 14 of the camera unit 6 (see FIG. 3B) to move as a unitary body with respect to a mounted position along the interior surface 8 of the mobile telephone. The OIS system 4 moves the unit 6 in response to movements of the mobile handheld device 2. These may be linear or rotational movements. Upon sensing uncontrolled motion imparted to the camera unit 6, the OIS system 4 generates time varying rotational forces with feedback control to reduce the net effect of the uncontrolled motion.

Referring also to FIG. 3, an exemplary gimbal adjustment system 16 of the OIS system 4 comprises a gimbaled plate 18 on which the camera unit 6 is mounted. The term gimbaled refers to the mounting of a component which permits rotation with multiple degrees of freedom. With the illustrated gimbaled plate 18 having three degrees of freedom to respond to forces generated by the OIS system, the camera unit 6 and the plate 18 together undergo selective angular rotation with respect to the interior surface 8 of the device 2. Components mounted to the gimbaled plate for rotation with multiple degrees of freedom, referred to as gimbaled components, receive OIS system forces with the plate 18 based on magnetic coupling.

The gimbaled plate 18 includes a lower surface 18L, the majority of which is a flat surface portion that extends in a plane, P. A first series of magnetic elements is positioned along the lower surface 18L of the gimbaled plate. The majority of an upper surface 18U of the gimbaled plate 18 is a flat surface portion residing in a plane parallel with the lower surface 18L. The camera unit 6 is mounted to the flat surface portion of the upper surface 18U. The OIS system 4 limits changes in orientation of the camera lens 10 and image sensor 12 with respect to rotations of the device 2 relative to a reference plane, RP (e.g., in three orthogonal directions) while orientation of the device interior surface 8 varies with respect to the reference plane RP. The device 2 includes electronic circuitry 13 and a power source 15 mounted to the surface 8. Generally, these and device components other than the camera unit 6, which are mounted along the surface 8, rotate with the device 2.

Figure 2:
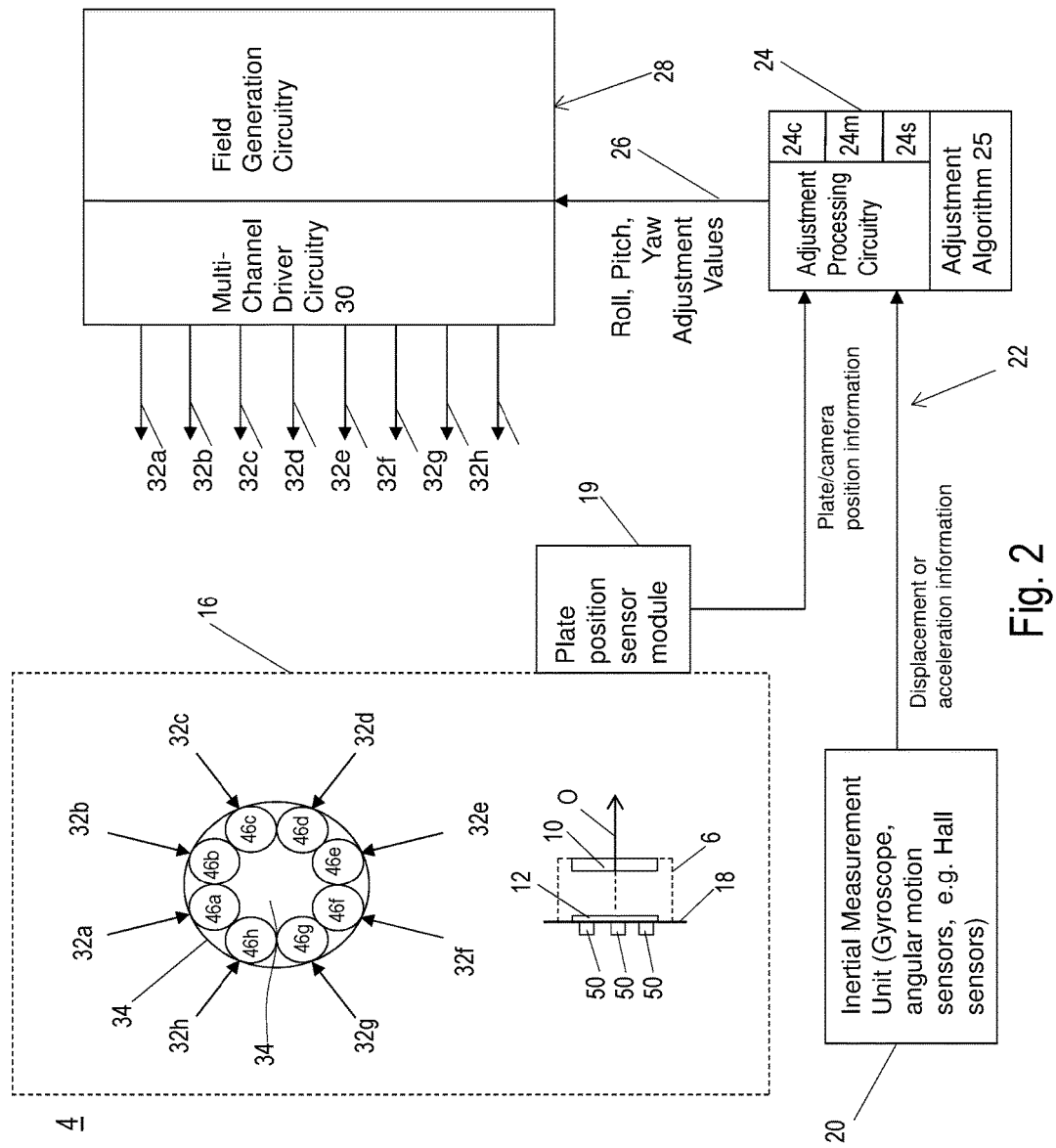
FIG. 2 is a schematic illustration of an embodiment of an optical imaging stabilization system incorporating the gimbal adjustment system to which the camera unit of FIG. 1 is mounted.

In the schematic representation of the Optical Image Stabilization (OIS) system 4, FIG. 2 illustrates select components of the gimbal adjustment system 16, including a plan view of the support base 34 and a side view of the gimbaled plate 18 with the attached camera unit 6. As more fully shown in FIG. 3, the gimbal adjustment system 16 also includes a support base 34 having a flat upper surface 34S facing the gimbaled plate 18. The support base 34 is fixed to the device interior surface 8 to undergo identical changes in orientation as the device 2. The support base 34 may be an integral portion of a device, e.g., the interior surface 8.

The OIS system 4 includes a plate position sensor module 19 and an Inertial Measurement Unit (IMU) 20. The plate position sensor module 19 monitors initial and current positions of the gimbaled plate 18 or the camera unit 6 with, for example, a combination of optical and inertial sensors. The IMU 20 senses movement of the device 2 in each of three orthogonal directions to provide a stream of displacement or acceleration information 22. An embodiment of the IMU comprises a gyroscope and accelerometers to measure change in position or rate of movement. Displacement or acceleration information 22 may be acquired with Hall sensors, applying the Kalman filter approach. The information 22 is provided to adjustment processing circuitry 24 which generates roll, pitch and yaw adjustment values 26 derived from the information 22.

The exemplary adjustment processing circuitry 24 is microprocessor based, comprising a cpu 24c, memory 24m and storage 24s, to execute an adjustment algorithm 25. However, the processing circuitry 24 may comprise a programmable logic controller or other form of dedicated logic. Adjustment values 26 are received into field generation circuitry 28 which converts the values to field strength magnitudes with which multi-channel driver circuitry 30 provides sets of time varying control signals 32a through 32h. Each control signal 32i may be a time varying current level applied to a corresponding magnetic element 46i positioned along surface 34S. Application of control signals 32 generates an array of time varying magnetic fields which couple with magnetic fields of the magnetic elements positioned along the lower plate surface 18L. Application of controllable Lorentz forces to the gimbaled plate 18 reduces net displacements of the camera lens 10 and the image sensor 12 with respect to the reference plane, RP. The Lorentz forces generate variable accelerations and decelerations of the plate 18 to mitigate uncontrolled motion of the plate 18 in as many as three orthogonal directions. The sets of control signals $32_i$ which generate the time varying magnetic fields are continually adjusted as updated motion information 22 is generated. This limits overshooting of optimal displacements and enables rapid adjustments in response to newly sensed changes in motion and position.

The support base 34 is fixed to the surface 8 to undergo the same changes in orientation as the device 2. The support base 34 may be an integral portion of the device 2, e.g., the interior surface 8. Serial application of sets of signals 32a through 32h limits changes in orientation of the gimbaled plate 18 when the handheld device 2 undergoes changes in orientation.

Figure 10:
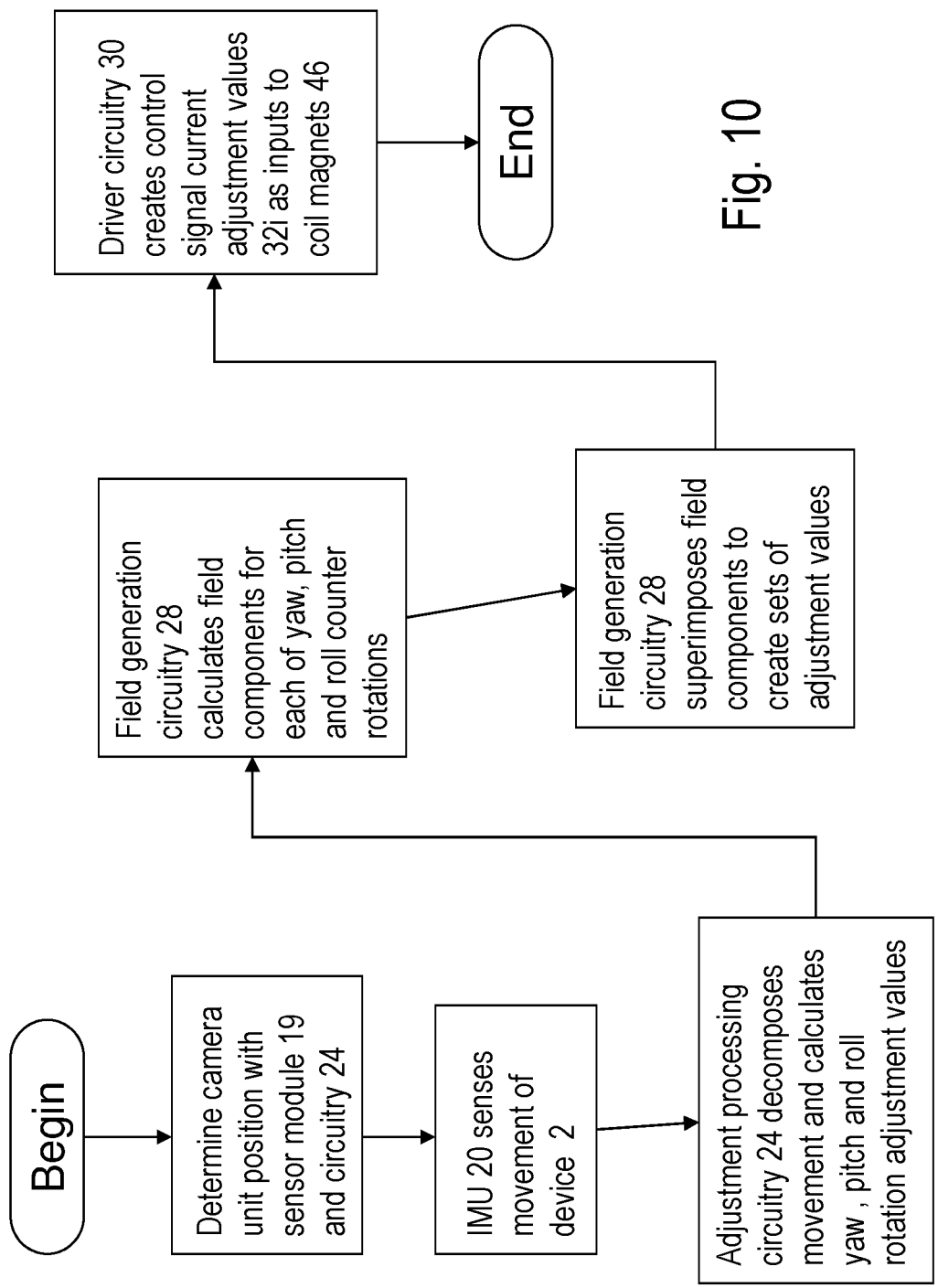
FIG. 10 is a flow chart illustrating an exemplary embodiment of a method of operating an optical image stabilization system to perform rotations illustrated in FIGS. 5 through 9.

Exemplary operation of the OIS system 4 to limit uncontrolled movement of the camera unit 6 is summarized in the flow chart of FIG. 10, beginning with a direct or indirect determination of an initial position of the camera unit 6 with the plate position sensor module 19. The IMU senses movement of the device 2. With this data, the adjustment processing circuitry 24 decomposes movement and calculates yaw, pitch and roll adjustment values. The field generation circuitry 28 calculates magnetic field components for each of yaw, pitch and roll rotations which counter sensed movement. The field generation circuitry 28 combines the field components to create sets of adjustment values. The driver circuitry creates control signal current adjustment values 32i as inputs to drive magnetic elements in the form of coil magnets.

The support base 34 includes a shaft 36 to which the gimbaled plate 18 is attached for rotation. The camera unit 6 is mounted to the plate 18 as a gimbaled component, i.e., for movement with the plate 18. The base upper surface 34S extends along a plane B with a second series of magnetic elements positioned thereon for selective field coupling with the first series of gimbaled magnetic elements positioned along the lower surface 18L. With the support base 34 attached to move with the hand-held device 2, all portions of the device 2, other than the gimbaled camera unit 6 and the plate 18, experience the same rotations during device movement.

Figure 3B:
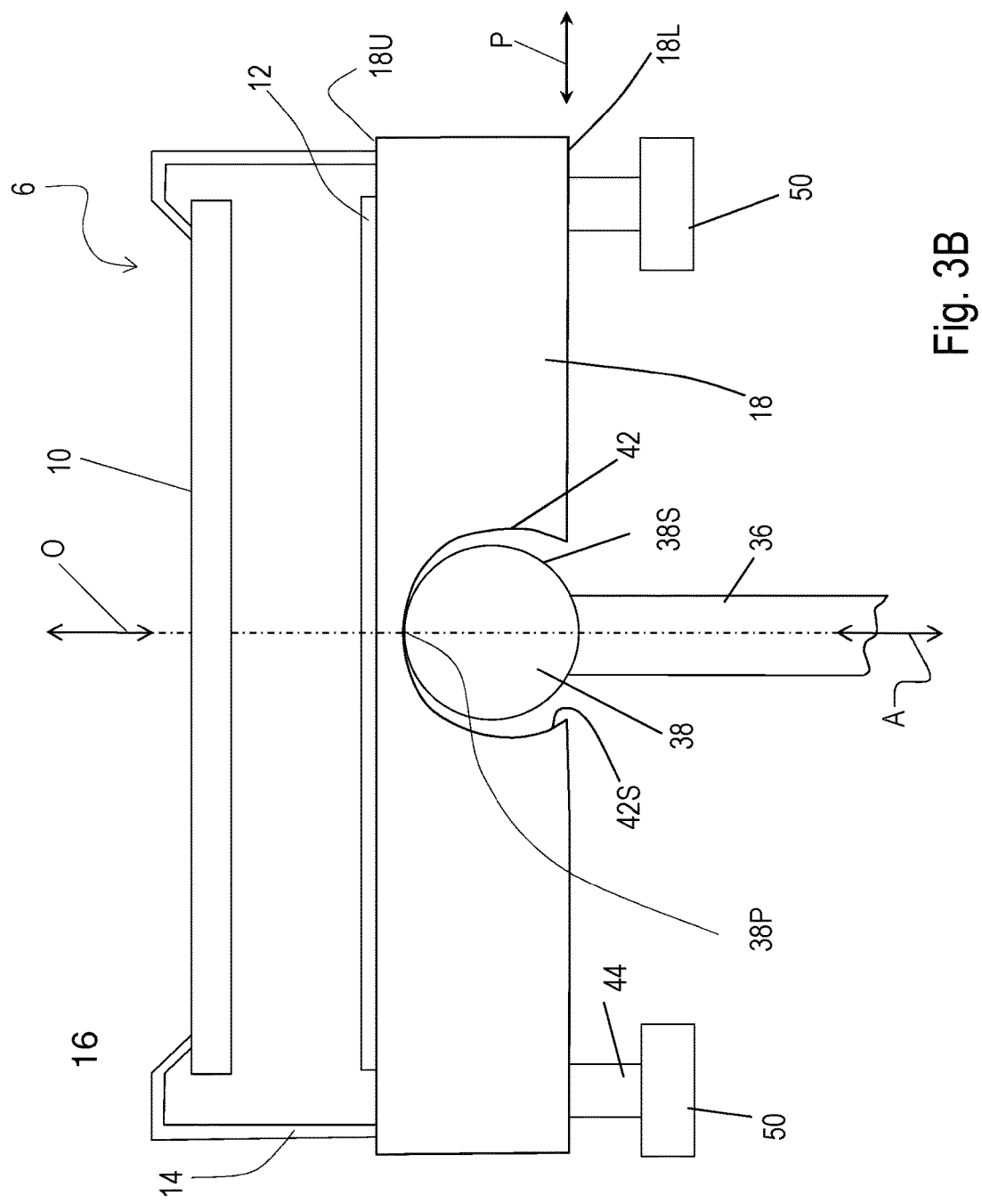
FIG. 3B is a partial view in cross section of the gimbal adjustment system shown in FIG. 3A taken through a central axis.

The shaft 36 extends symmetrically about an axis, A, perpendicular to the upper base surface 34S. As shown in FIG. 3B, an end of the shaft 36, positioned away from the base 34, culminates in a pivot 38 having a surface 38S adapted for mating engagement with a portion of the plate 18 to permit relative rotation of the plate 18 about the pivot 38. Although shown as a spherical section in FIG. 3B, the shape of the pivot 38 may vary. The axis, A, passes through a central point 38P along the spherical surface 38S which serves as a central pivot point 38P about which there is contact between the gimbaled plate 18 and the pivot 38. The lower plate surface 18L includes a recess 42 having a curved surface 42S extending into the plate 18 for mating engagement with the pivot 38. The curved surface 42S and the pivot surface 38S are complementary contours where one surface receives the other to form an attachment joint (e.g., a "ball and socket" joint) for rotation about the pivot 38 with three degrees of freedom. The attachment joint may comprise other types of suspensions, such as spherical bearings, fluid-based suspension or other types of joints which permit angular rotation about a central point with multiple degrees of freedom.

For a first configuration of the system 16 shown in FIGS. 3A and 3B, both the plane, P, of the gimbaled plate, and the plane, B, of the support base 34 are parallel to the reference plane RP. Possible rotational changes in orientation of the gimbaled plate 18 about the pivot point 38P include tilt (i.e., pitch or roll rotation) with respect to the plane B, and movement within the plane P (i.e., yaw rotation). With the optical axis, O, of the lens 10 aligned with the axis A, when the control signals 32 generate fields that cause yaw rotation of the gimbaled plate 18 about the axis, A, the camera lens 10 and image sensor 12 undergo rotation about the optical axis, O.

Figure 3C:
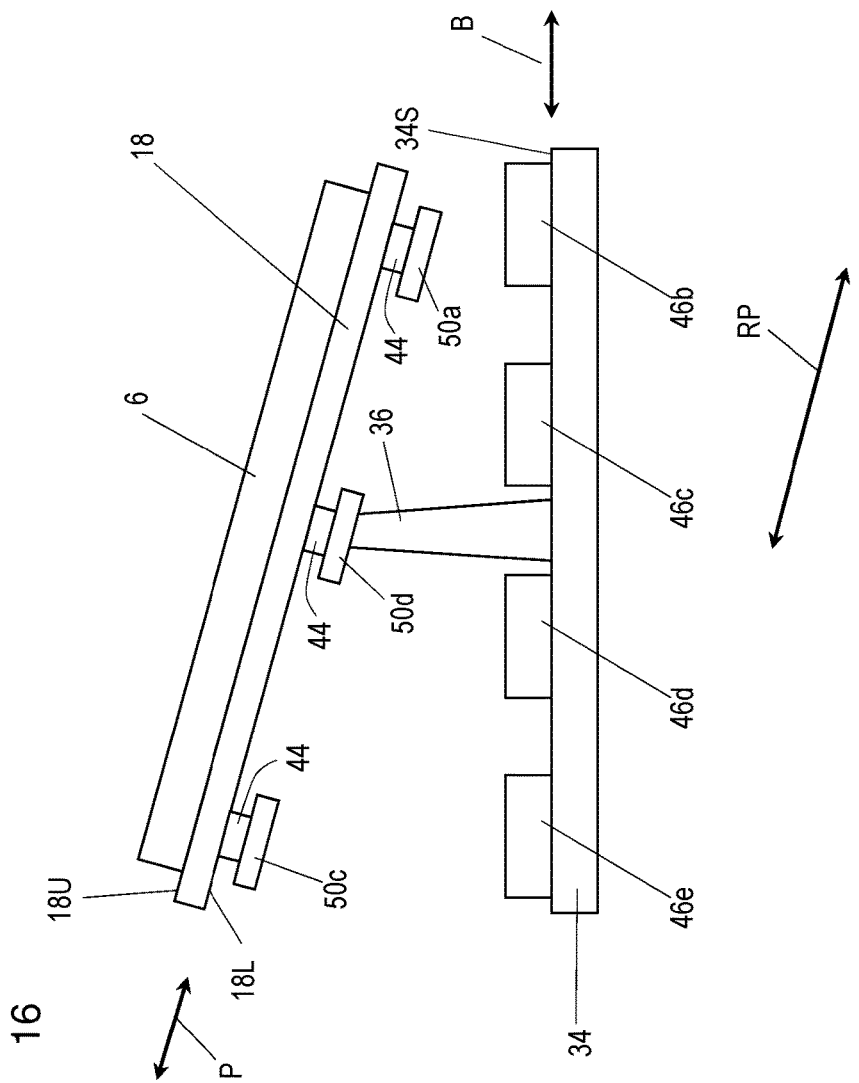
FIG. 3C is a side view of the gimbal adjustment system showing the camera and gimbaled plate tilted along a first direction with respect to an underlying support.
Figure 3D:
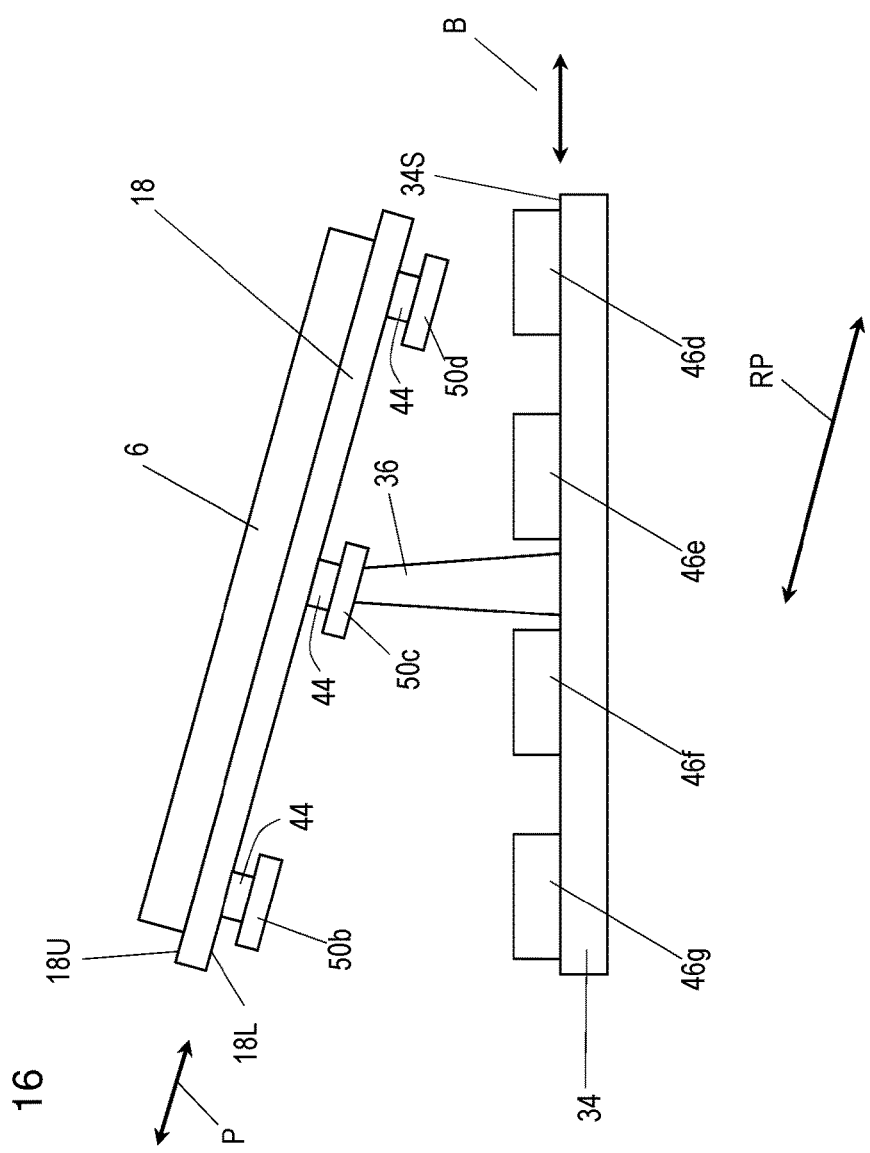
FIG. 3D is another side view of the gimbal adjustment system after a ninety degree rotation about the axis, showing the camera and gimbaled plate tilted along a second direction orthogonal to the first direction.

FIGS. 3C and 3D illustrate exemplary second and third configurations of the gimbal adjustment assembly when signals 32 are applied to impart rotational tilts to the gimbaled components relative to the support base 34. Specifically, the OIS system 4 is shown maintaining the plane, P, of the gimbaled plate in a parallel orientation with respect to the reference plane, RP when the plane, B, is no longer parallel to the Reference Plane RP.

Designs, geometries and arrangements of magnetic elements for the OIS system 4 are exemplary, and numerous other configurations are useful. In the illustrated example, the magnetic elements on the support base are coil magnets 46 occupying fixed positions on the device surface 8. The magnetic elements on the gimbaled plate 18 are permanent magnets 50 mounted along the lower plate surface 18L and facing the base upper surface 34S.

All of the exemplary coil magnets 46 are of the same design with like size and shape, each being geometrically symmetric so that when each coil magnet is energized it produces substantially the same field pattern for a given current input. The magnetic coils 46 are of a cylindrically symmetric shape, each having the cylindrical axis of symmetry parallel with the axis A. With this parallel orientation, components corresponding to peak field strength magnitude of each coil 46 are in a direction parallel to the axis A, i.e., toward or away from the lower plate surface 18L. Other field orientations, including variations in field orientations among the coil magnets 46, may be advantageous for enhanced coupling of fields between coil magnets 46 and permanent magnets 50. When the control signals 32 provide each illustrated coil magnet 46 with the same input current, the magnetic fields generated by the coils all have substantially the same spatial strength and distribution along the lower plate surface 18L. Also, in the disclosed embodiments, with the coil magnets 46 arranged on a circular path $C_1$ and the permanent magnets 50 arranged on a circular path $C_2$, all of the magnets are illustrated as positioned the same distance, on-center, from the axis, A. In an alternate design, one set of magnets (e.g., the magnets 46) may be positioned a larger radial distance from the axis than the other set of magnets (e.g., the magnets 50). In such an arrangement, with coil magnets positioned radially outward with respect to permanent magnets, coupling could be enhanced with the coil magnets having magnetic cores. Such a design would take into consideration a danger of lockup, in which one of the permanent magnets may get too close to a core.

The exemplary permanent magnets 50 are all of the same design, each being of the same cylindrically symmetric shape and size. Each of the permanent magnets 50 is positioned to have the cylindrical axis of symmetry extend in directions perpendicular to the plate lower surface 18L and the plane, P. This facilitates directing substantially the same field shape and field strength magnitude in a direction perpendicular to the surface 18L. However, other field orientations may be advantageous to effect desired coupling of fields.

Figure 4B:
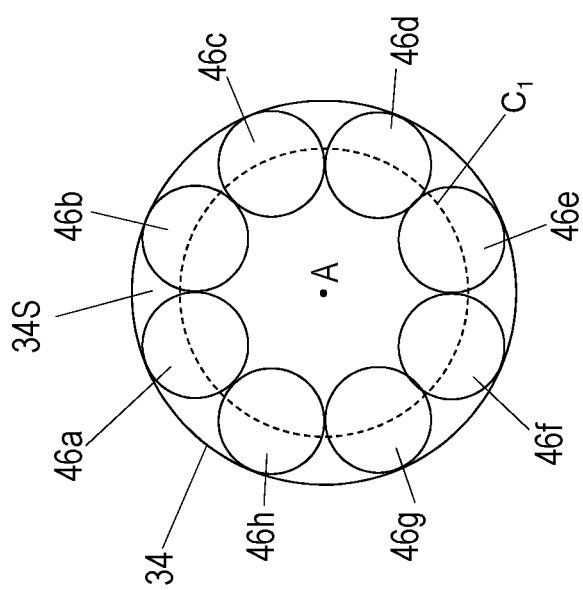
FIG. 4B illustrates features along the lower surface of the gimbaled plate shown in FIG. 3, as viewed from along an upper surface of the support base.
Figure 4A:
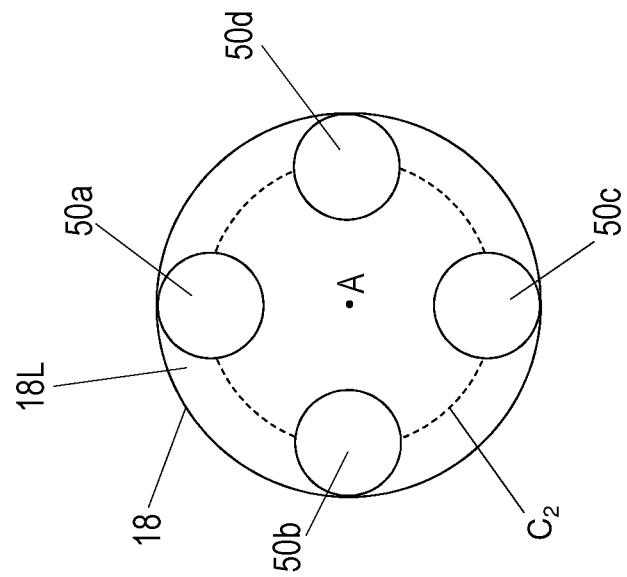
FIG. 4A is a plan view of the support base shown in FIG. 3 when viewed from a lower side of the gimbaled plate which faces the support base.

The exemplary gimbal adjustment system 16 includes eight coil magnets 46a through 46h, and four permanent magnets 50a through 50d. The coil magnets 46 are spaced equidistant from one another along a first circular path $C_1$, symmetrically centered about the axis, A, and spaced apart at 45° intervals about the axis. See FIG. 4A. The permanent magnets are spaced equidistant from one another along a second circular path $C_2$, symmetrically centered about the axis, A, and spaced apart at 90° intervals about the axis. See FIG. 4B. The magnets 50 are in a sequence where the orientation of magnetic poles N and S alternately face the support base 34 so that every other magnet 50 in the sequence has a like pole facing the support base 34.

The annotation "N" when used for a coil magnet 46a-46h indicates the magnet is energized by a control signal $32i$ resulting in a magnetic pole N facing the lower plate surface 18L, with associated magnetic field lines pointing away from the plane B and toward the gimbaled plate 18. The annotation "S" indicates a coil magnet 46i is energized by a control signal $32_i$ resulting in a magnetic pole S facing the lower plate surface 18L, with associated magnetic field lines pointing toward the plane B and away from the gimbaled plate 18.

The annotation "N" when used for a permanent magnet 50a-50d indicates the magnetic pole N faces the support base 34 with the associated field lines pointing away from the magnet, toward the base 34. The annotation "S" when used for a permanent magnet 50a-50d indicates the magnetic pole S faces the support base 34 with the associated field lines pointing toward the magnet, away from the base 34. The field patterns of permanent magnets 50 directed toward the support base 34 are substantially the same regardless which pole faces the support base 34.

When the plane, P, along which the lower plate surface 18L extends, is parallel to the base upper surface 34S as shown in FIG. 3A, the gimbaled plate is in a level position with respect to the plane B, and the permanent magnets 50 are oriented to direct field components having largest magnitudes predominantly along directions of the axis, A, for coupling with field components generated by the coils 46. When the control signals 32a-32f are the same magnitudes, all of the coil magnets 46 can generate substantially the same field patterns along directions of the axis, A. The forces resulting from field coupling can therefore be of like magnitude. The ability to achieve balanced forces with axially symmetric field coupling facilitates sequential application of force fields for rotational motions of the gimbaled plate 18 out of the plane P.

When field coupling between coil magnets 46 and permanent magnets 50 is accompanied by symmetries and uniformities of the embodiment, the stabilization system 4 provides enhanced forces and control too rapidly and precisely effect small rotations. The symmetries and uniformities also facilitate simpler, predictable and more precise field interactions to (i) reduce the complexity of the circuitry 24, (ii) reduce complexities of field generating control signals, and (iii) improve responsiveness of feedback control.

The shaft length may be minimized to assure that the varied magnetic field patterns generated with the coil magnets 46 result in sufficient force fields to provide necessary control for rapid angular acceleration and deceleration of the plate 18 in any plane passing through the pivot point 38P. Effective field strengths may be limited by size constraints of the magnetic coils 46 and the permanent magnets 50, which may comprise Neodymium. Coil magnet field strength is subject to practical limitations in the amount of current which can be applied to energize the coils 46. Also, with regard to pitch and roll, the length of the shaft 34 and the diameter of the path $C_2$, about which the permanent magnets are distributed, can limit the range of tilt due to physical interferences, e.g., between any of the magnets and the plate 18 or the base 34.

Given that the field strength generated by the coil magnets diminishes as a function of the third power of distance, embodiments of the invention position the center of mass of gimbaled components within the attachment joint, e.g., to coincide with, or be relatively close to, the pivot point 38P. Gimbaling about the center of mass reduces rotational inertia and the forces required to rotate the camera unit 6. This, in turn, reduces battery drain for mobile devices and can render it more advantageous to apply the OIS system 4.

The combination of components rotatable about the central pivot point 38P, comprising at least the plate 18, the camera unit 6 and the permanent magnets 50 form a gimbaled assembly 51 having a characteristic center of mass. In one embodiment, mass components are distributed about the gimbaled assembly 51 in a discrete or continuous manner to shift the position of the center of mass of the assembly 51 to coincide with or to be close to the central pivot point 38P. This may also be accomplished by varying the size or density of components (e.g., the shape, thickness or specific weight of the plate 18). With the shape of the gimbaled assembly 51 corresponding to a continuous outer surface 52 of the assembly 51, a size metric $\mathscr{R}$, may be constructed which is based on the distance between each in a plurality of points along the outer surface 52 and the center of mass of the assembly 51, the distances being measurable in a radially outward direction from the center of mass. With the shape of the gimbaled assembly being a combination of a limited number of symmetrical shapes (e.g., a plate, multiple cylindrically shaped magnets, and a rectangular shaped camera unit 6) a size metric, indicative of the outside dimensions of the outer shape of the gimbaled assembly can be based on a total outer surface area, σ, of the assembly 51. Further, for the illustrated embodiment shown in FIG. 3, the length, width and height dimensions of the gimbaled assembly may be expected to differ by less than one order of magnitude. Given these factors, a size metric, $\mathscr{R}$, having the dimension of length, can provide a general indication of the overall size of the outside shape of the gimbaled assembly 51, i.e., a rough order of magnitude indication of a dimension representative of the assembly 51. Such a metric can be used to generally describe a minimum distance between the central pivot point 38P and the center of mass of the gimbaled assembly 51.

For this purpose, $\mathscr{R}$ can be based on an average value of differences in position between the center of mass and a number of points evenly distributed about the shape 52 of the surface. The minimum number of such points used to calculate the average value may be made equal to the number of evenly distributed points along the surface that are required to provide an estimated surface area, σ, of the shape 52, e.g., within 20 percent of the actual total surface area. Using these criteria, $$\mathscr{R} = \frac{\sqrt{\sigma}}{2\sqrt{\pi}}.$$

Given that the surface 52 is generally not radially symmetric or spherical about the center of mass, $\mathcal{R}$ is not expected to indicate an average radial distance between the center of mass and the surface 52. Nonetheless, the measure $\mathcal{R}$ has some general association with the overall dimensions of the assembly, and can be expected to be relatively large for large assemblies, or relatively small for small assemblies. Using $\mathcal{R}$ as a rough order of magnitude estimate of the linear dimensions of the assembly 51, when the gimbaled assembly is designed to have the center of mass closely aligned with the central pivot point 38P, the alignment may be expressed as the product $x\mathcal{R}$, where $x<1$. For example, x may have values ranging from less than 0.5 through 0.005, including 0.35, 0.25, 0.1, 0.05, 0.04, 0.02.

In other instances, a satisfactory basis for the metric, $\mathcal{R}$, is a height, width or depth dimension, such as had by defining a height, h, of the gimbaled assembly to be the separation distance between one of the permanent magnets 50 and the camera lens 10. Using this metric as $\mathcal{R}$, a desired degree of alignment between the center of mass of the gimbaled assembly 51 and the central pivot point 38P may be specified as the product $x\mathcal{R}$, where $\mathcal{R}$=h and $x<1$ with x having the afore listed values.

An exemplary method, for bringing the center of mass of the gimbaled assembly 51 close to the pivot point 38P, positions a spacer 44 between each permanent magnet 50 and the lower gimbal plate surface 18L. See FIG. 3A. The spacers 44 displace the magnets away from the lower surface 18L to shift the center of mass of the gimbaled assembly 51 to, or relatively close to, the pivot point 38P. That is, the center of mass of the gimbaled assembly is shifted toward the pivot point 38P relative to a location where the center of mass would be if the permanent magnets 50 were mounted directly on the surface 18U.

FIGS. 5 through 8 illustrate operation of the gimbal adjustment system 16 to rotate the plate through a series of positions along each of three orthogonal directions. Each position of rotation can be held stationary by sustaining a set of field configurations generated by the coil magnets 46. However, with continual motion of the gimbaled plate during normal operation of the OIS system 4, the illustrated positions are transitory. Continual motion results from changing the values in sequentially generated sets of signals 32*i*. See FIGS. 2 and 10. Each new set of signal values varies the set of field patterns generated by the coils 46 based on system feedback. For the example rotations shown in FIG. 6, fields generated according to example specifications in FIG. 5, couple with fields of the permanent magnets 50 to rotate the gimbaled plate 18 in directions parallel with the plane, P. This results in rotation of the camera unit 6 about the optical axis, O, to limit uncontrolled movement in directions parallel with the plane, P. For the examples shown in FIGS. 3C, 3D, 9A, and 9B, fields couple to rotate the gimbaled plate 18 in directions outside the plane, P, to provide tilt with respect to the reference plane RP. The OIS system 4 can combine rotational movements in the plane, P, of the gimbaled plate (a first orthogonal direction) with rotational movements out of the plane, P, (two additional orthogonal directions) to counter uncontrolled movements of the handheld device 2. The system 4 may effect desired movement by generating coil field specification values (i.e., values of the input signals 32*i*) which each address movement in multiple orthogonal directions (i.e., by superposition of field components associated with multiple orthogonal directions) or by serially generating field configurations in each of multiple orthogonal directions (i.e., in a sequence).

Transitions between plate positions in FIG. 6 are effected by energizing the coils 46 with multiple sets of input signals 32*i*. Signals in each set are current levels, which vary in magnitude and sign, applied to generate field components of desired magnitudes and directions. Without limiting the scope of the invention, example combinations of field magnitudes and directions shown in FIGS. 5A through 5I illustrate concepts of operating the gimbal adjustment system 16. Each coil magnet 46 is energized to create a field component of designated pole N or S and magnitude 0, 1, 2 or 3. The resulting combination of coil fields for eight magnets 46 is based on field specifications such as provided in FIGS. 5, 7 and 9. The field specifications, which correspond to the values of the input signals 32*i*, are also represented as an eight element field pole vector where the sequence of elements corresponds to the values of the coil magnet input signals 32*i* in the sequence of coil magnets 46*a*-46*h*.

FIGS. 5A through 5I are plan views of the support base 34, each providing a set of coil specifications based on an eight element field pole vector. The sets provide a multi-step sequence of field configurations with which the gimbaled plate 18 turns through a ninety degree rotation in the plane P. FIGS. 6A through 6I are plan views of the gimbaled plate 18 taken along the plane, P, viewed from above the gimbaled plate 18, to illustrate corresponding changes in a sequence of four interim plate rotations collectively creating the ninety degree rotation. The interim rotations result from changes in values in the sets of control signals 32*i* issued by the field generation circuitry 28 and applied to the coil magnets 46. Each set of field coil specifications indicated in FIGS. 5A through 5I corresponds, respectively, to a set of forces associated with a gimbaled plate position or rotation shown in FIGS. 6A through 6I. The coil configuration specified in each of the FIGS. 5A, 5C, 5E, 5G and 5I corresponds, respectively, to a stable position shown in each of the FIGS. 6A, 6C, 6E, 6G and 6I.

The gimbaled plate positions in FIG. 6 are exemplary of an arbitrary range of yaw rotations which can result from applying a sequence of motive forces along one direction of rotation in the plane, P. Pitch and roll rotations may simultaneously occur with the yaw rotations, i.e., in out of the plane, P, by superimposing unbalanced forces with the field pole vector illustrated in FIG. 9A. Rotations of the gimbaled plate 18 are indicated in FIG. 6 by angular movement of the permanent magnets 50*a* through 50*d* relative to two series of static planes 54, 56 and fixed positions of the coil magnets 46 in FIG. 5.

To provide a simplified illustration of operating the gimbal adjustment system 16, sequences of coil field configurations are described with sets of coil field specifications, based on the combinations of field magnitude and pole direction shown in FIGS. 5, 7, and 9, for energizing each coil 46 in a spatial region of interest. The term spatial region of interest refers, for example, to a volume in which the field of a coil 46 and the field of a permanent magnet 50 interact to effect motion of the gimbaled plate.

Field strength magnitudes of all coil magnets 46, indicated by the numbers 1, 2 or 3, refer to the same relative strengths, regardless whether a magnitude is associated with a pole N or S. The magnitude 3 indicates the strongest of three relative field strengths, the magnitude 1 indicates the weakest of three non-zero field strengths, and the magnitude 2 indicates a field strength intermediate the strengths 1 and 3. Specific to a coil 46, the pole notation N indicates the pole N faces the gimbaled plate 18 with field lines extending between the support base 34 and the gimbaled plate 18, which field lines point toward the gimbaled plate; and the pole notation S indicates field lines extending between the support plate and the gimbaled plate which point away from the gimbaled plate 18. For example, in FIGS. 5, 7, and 9, N-3 indicates a strongest field magnitude having field lines pointing toward the gimbaled plate.

For purposes of illustration, the coil magnet field magnitude associated with N-2 or S-2 may be considered twice the magnitude associated with N-1 or S-1, and the coil magnetic field magnitude associated with N-3 or S-3 may be considered three times the magnitude associated with N-1 or S-1. The gimbal adjustment system 16 may employ different relative field strength ratios or a continuum of field strength magnitudes. Generally, control and stabilization of the gimbaled plate 18 may involve continual application of varying fields.

The illustrated embodiments generate gimbaled plate movements by driving the eight coil magnets positioned on the support base 34 with a sequence of the afore-described input magnitudes to generate time varying field configurations for interaction with fields of the four permanent magnets positioned on the plate 18. Each set of input magnitudes in the sequence generates field configurations used to create a set of forces, referred to as force fields. Sets of field specifications described with the figures are exemplary and many other configurations can be generated to provide additional motive forces that counter uncontrolled rotational movements. The size, shape and number of coil magnets 46 and permanent magnets 50 deployed in the gimbal adjustment system 16 will vary depending on the application.

The sequences described in FIGS. 5 and 6 begin with the adjustment system in an initial state with planes P, B, and RP parallel to one another, as illustrated in FIG. 3A. The initial state position and subsequent positions are continuously monitored with the plate position sensor module 19. See FIG. 2. For the examples in FIGS. 5 and 6, field configurations and plate rotations are achieved with sets of control signals 32i that retain the flat portion of the lower plate surface 18L orthogonal to the axis, A. Symmetric application of fields with the coil magnets 46 keeps the plane P of the gimbal plate 18 parallel to the plane B.

A sequence of gimbaled plate positions is described in FIGS. 5 and 6 with the plane P maintained parallel to the plane B. Positions are illustrated relative to a series of four planes 54a-54d and a series of four planes 56a-56d. Each plane contains the axis A. The planes 54 each pass midway between a first pair of adjacent coils (i.e., coil magnets) 46 and midway between a second pair of adjacent coils 46 diametrically opposite the first pair of coils. Plane 54a passes midway between magnets in the pair 46a, 46b and midway between magnets in the pair 46e, 46f. Plane 54b passes midway between magnets in the pair 46b, 46c and midway between magnets in the pair 46f, 46g. Plane 54c passes midway between magnets in the pair 46c, 46d and midway between magnets in the pair 46g, 46h. Plane 54d passes midway between magnets in the pair 46d, 46e and midway between magnets in the pair 46h, 46a. The planes 56 each pass through the axis of symmetry in each of two diametrically opposed coils. Plane 56a passes through coil magnets 46a, 46e; plane 56b passes through coil magnets 46b, 46f; plane 56c passes through coil magnets 46c, 46g; and plane 56d passes through coil magnets 46d, 46h.

For any configuration of the plate 18, each permanent magnet 50 will, at most, be closest to two coil magnets 46. For example, magnet 50a is closest to coil magnet 46c in FIGS. 5G and 6G; and magnet 50a is closest to coil magnets 46c and 46d in FIGS. 5I and 6I. For any plate position, the magnetic force on a permanent magnet 50 will be primarily due to the closest one, two, or three coil magnets 46. As an example of one nearest magnet, in FIGS. 5C and 6C the permanent magnet 50a is in equilibrium over one magnet 46b, and the force from magnet 46b is the primary source of the field acting on magnet 50a. As an example of two nearest magnets, in FIGS. 5A and 6A, the permanent magnet 50a is in equilibrium, positioned equidistant from magnets 46a and 46b, and the fields from magnets 46a and 46b are the primary sources of the forces acting on magnet 50a. As an example with three nearest coils, in FIGS. 5D and 6D, the permanent magnet 50a is positioned over coil magnet 46b, and the coil magnets 46a, 46b, and 46c are the primary sources of the magnetic field acting on 50a.

The field configurations that rotate the gimbaled plate 18 (see FIGS. 5, 7, and 9) are described with reference to groupings of adjacent coil magnets in pairs. For the exemplary system with four permanent magnets 50 and eight coil magnets 46, two pair sets are operative: Da and Db. The coil pair sets are associated with both plate rotation and plate stabilization. The coil pair sets provide two types of "Actions": rotation ("nudge") and stabilization ("static"). These result in two neutral position types with respect to coil magnets where the permanent magnets are (i) positioned above and equidistant from two closest coil magnets ("straddle" alignment position), or (ii) centered above a coil magnet ("single" coil magnet alignment position). Table 1 summarizes these Actions and intermediate Positions for magnet 50a as shown in FIGS. 5 and 7. Table 1 also indicates which coil magnets 46 are Closest to 50a, and which coil magnets 46 are acting to provide influential magnetic forces (Influential Forces) on magnet 50a.

Coil pair set Da associated with gimbaled plate rotation to, and stabilization in, the first and fifth positions in the sequence (shown in FIGS. 6A and 6H respectively) includes coil pairs: 46a, 46b; 46c, 46d; 46e, 46f; and 46g, 46h. See FIGS. 5A, 5I, and 7H. For coil pair set Da, in accord with a clockwise direction, the coils 46a, 46c, 46e and 46g are each referred to as the first coil in a pair; and the coils 46b, 46d, 46f and 46h are each referred to as the second coil in a pair.

Coil pair set Db associated with gimbaled plate rotation to, and stabilization in, the third and seventh positions in the sequence (shown in FIGS. 6E and 8B respectively) includes coil pairs: 46b,46c; 46d,46e; 46f,46g; and 46h,46a. See FIGS. 5E and 7D. For coil pair set Db, in accord with a clockwise direction, the coils 46b, 46d, 46f and 46h are each referred to as the first coil in a pair; and the coils 46c, 46e, 46g and 46a are each referred to as the second coil in a pair.

| Base | | | Coils acting on 50a | | Plate | | |
|---|---|---|---|---|---|---|---|
| FIG. | Action | Position | Closest | Influential Forces | FIG. | Position | Pair Sets |
| 5A | static | straddle | 46a, 46b | 46a, 46b | 6A | first | Da |
| 5B | nudge | | 46a, 46b | 46a, 46b | | | |
| 5C | static | single | 46b | 46b | 6C | second | n/a |

-continued

| Base | | | Coils acting on 50a | | Plate | | |
|---|---|---|---|---|---|---|---|
| FIG. | Action | Position | Closest | Influential Forces | FIG. | Position | Pair Sets |
| 5D | nudge | | 46b | 46a, 46b, 46c | | | |
| 5E | static | straddle | 46b, 46c | 46b, 46c | 6E | third | Db |
| 5F | nudge | | 46b, 46c | 46b, 46c | | | |
| 5G | static | single | 46c | 46c | 6G | fourth | n/a |
| 5H | nudge | | 46c | 46b, 46c, 46d | | | |
| 5I | static | straddle | 46c, 46d | 46c, 46d | 6H | fifth | Da |
| 7A | nudge | | 46c, 46d | 46c, 46d | | | |
| 7B | static | single | 46d | 46d | 8A | sixth | n/a |
| 7C | nudge | | 46d | 46c, 46d, 46e | | | |
| 7D | static | straddle | 46d, 46e | 46d, 46e | 8B | seventh | Db |
| 7E | nudge | | 46d, 46e | 46d, 46e | | | |
| 7F | static | single | 46e | 46e | 8C | eighth | n/a |
| 7G | nudge | | 46e | 46d, 46e, 46f | | | |
| 7H | static | straddle | 46e, 46f | 46e, 46f | 8D | first | Da |

Figures 5A, 6A:
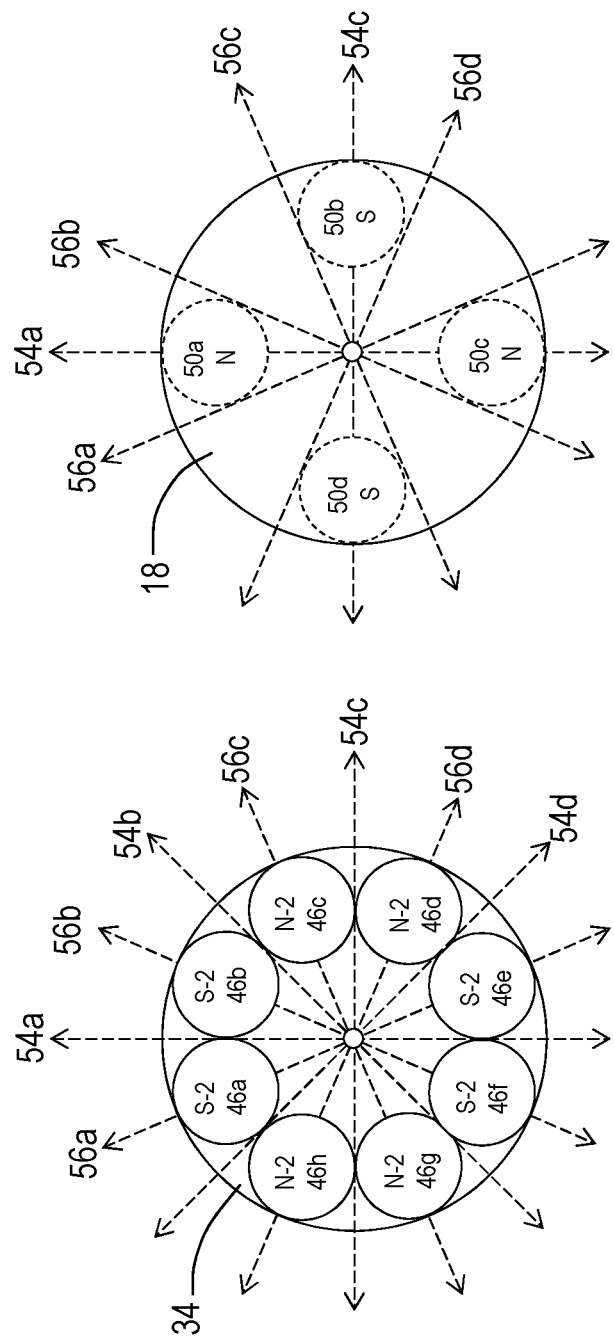
Figure 6B:
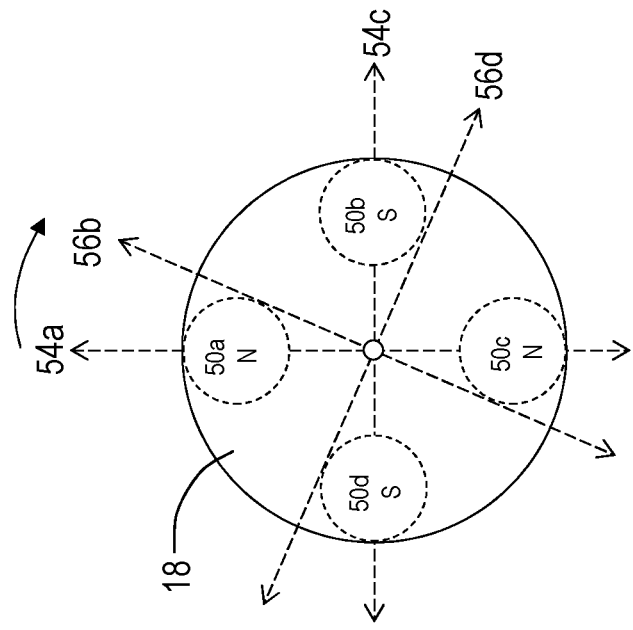

FIG. 6A illustrates a first in the sequence of interim positions of rotation for the gimbaled plate 18. The first plate position is maintained with a first set of coil field configurations defined by the coil field specifications in FIG. 5A, having the field pole vector [S-2,S-2,N-2,N-2,S-2,S-2,N-2,N-2] where magnet 46a has magnitude S-2, magnet 46b has magnitude S-2, magnet 46c has magnitude N-2, etc. Interaction with the permanent magnets 50 results in a first set of force fields that center each magnet 50 in one of the planes 54a or 54c passing midway between adjacent magnets in each of two diametrically opposed pairs of coil magnets 46. More generally, at this and at numerous other positions of rotation, created by applying other sets of coil field specifications to the gimbal adjustment system 16, the axis of symmetry of each permanent magnet 50 may be in one of the planes 54a, 54b, 54c or 54d that passes midway between two pairs of coil magnets positioned diametrically opposite one another. In FIG. 6A the magnets 50a and 50c are centered about the plane 54a, and the magnets 50b and 50d are centered about the plane 54c. In FIG. 5A with the stated field pole vector, with the forces between coil magnets 46 and permanent magnets 50 being the same and therefore balanced, the OIS system 4 provides a neutral plate position.

To effect this stable configuration, first and second adjacent magnet 46 in each pair have like pole orientations while adjacent pairs of magnets 46 in the sequence along the path $C_1$ alternate in pole orientation. As an example, magnets 46a, 46b each have the magnetic pole S facing the gimbaled plate 18 with a field magnitude 2. This attracts the field associated with the pole N of permanent magnet 50a. The coil magnets 46c, 46d each have the magnetic pole N facing the gimbaled plate 18 with a field magnitude 2 that attracts the field associated with the pole S of permanent magnet 50b. Similarly, the S fields associated with magnets 46e, 46f attract the N field associated with the magnet 50c, and the N fields associated with magnets 46g, 46h attract the S field associated with the magnet 50d.

With the eight coil magnets 46a through 46h each capable of generating field patterns of like shape and magnitude, the first and second adjacent magnets in each pair along the path $C_1$ generate like field components with like poles each facing toward the plate 18, or facing away from the plate 18 toward the base of the generating coil. Following a clockwise direction along the path $C_i$, poles of coil magnets 46a through 46h facing the gimbal plate provide the field polarity vector [S-2,S-2,N-2,N-2,S-2,S-2,N-2,N-2]. Multi-channel driver circuitry 30 in the field generation circuitry 28 provides control signals 32 having current inputs of the same magnitude to first and second adjoining coils 46 in each pair of coils. This simultaneously generates the field pole patterns: (i) SS with pair 46a, 46b, (ii) NN with pair 46c, 46d, (iii) SS with pair 46e, 46f; and (iv) NN with pair 46g, 46h. Resulting pairs of coil field patterns complement the alternating field patterns of the permanent magnets to assure each permanent magnet 50 is predominantly attracted by the fields created with a pair of adjacent coils 46 on the support base 34. In accord with specifications described for each coil in FIG. 5A, adjacent coils in each pair are energized to generate a field configuration of magnitude 2 that positions the permanent magnets 50 as shown in FIG. 6A. The coil field specifications described in FIG. 5A are exemplary. Similar effects can be accomplished with other specifications. The corresponding magnet positions shown in FIG. 6A could be reached with groups of adjacent coils (e.g., pairs, or groups of three, four or more adjacent magnets 46). In one series of embodiments the number of groups of adjacent coils magnets 46 is equal to the number of permanent magnets 50. In one example, the number of coil magnets is twice the number of permanent magnets. When the number of coil magnets in a group of adjacent coils is three, the middle coil may become opposite in pole orientation to that of the other two coil magnets in the group (e.g., by reversing the pole orientation of the other two coil magnets) to create the neutral position. Selected field magnitudes and poles define for each magnet 50 a position corresponding to a lowest energy state creating a neutral plate position.

For the set of coil field patterns shown in FIG. 5A, with the pole N of permanent magnet 50a facing the support base 34, each in the adjacent pair 46a and 46b is energized to create a coil pole S with magnetic field extending toward the base 34 with an associated field magnitude 2. With this arrangement the magnet 50a is attracted to a lowest energy position of rotation wherein the axis of symmetry of the cylindrically shaped permanent magnet 50a is in the plane 54a. The magnet 50a is positioned equidistant from the coils 46a and 46b and, relative to the reference plane RP, the magnet 50a is positioned above the coil magnets 46a and 46b.

With the pole S of permanent magnet 50b facing the support base 34, each in the pair of adjacent magnets 46c and 46d is energized to create a coil pole N with a field extending toward the plate 18 with an associated field magnitude 2. With this arrangement, magnet 50b is attracted to a lowest energy position where the axis of symmetry of the cylindrically shaped permanent magnet 50b is in the plane 54c. The magnet 50*b* is equidistant from the coils 46*c* and 46*d* and, relative to the reference plane RP, the magnet 50*b* is positioned above the coils 46*c* and 46*d*.

Similarly as described above for magnet 50*a*, with the pole N of permanent magnet 50*c* facing the support base 34, each in the pair of adjacent coils 46*e* and 46*f* is energized to create a coil pole S with magnetic field extending toward the base 34 with an associated field magnitude 2. With this arrangement the magnet 50*c* is attracted to a lowest energy position of rotation wherein the axis of symmetry of the cylindrically shaped permanent magnet 50*c* is in the plane 54*a*. The magnet 50*c* is equidistant from the coils 46*e* and 46*f* and, relative to the reference plane RP, the magnet 50*c* is positioned above the coils 46*e* and 46*f*.

Similarly as described above for magnet 50*b*, with the pole S of permanent magnet 50*d* facing the support base 34, each in the pair of adjacent magnets 46*g* and 46*h* is energized to create a coil pole N with field extending toward the plate 18 and an associated field magnitude 2. With this arrangement the magnet 50*d* is attracted to a lowest energy position of rotation wherein the axis of symmetry of the cylindrically shaped permanent magnet 50*d* is in the plane 54*c*. The magnet 50*d* is positioned equidistant from the coil magnets 46*g* and 46*h* and, relative to the reference plane RP, the magnet 50*d* is positioned above the coil magnets 46*g* and 46*h*.

When the gimbaled plate 18 is in the initial position shown in FIG. 6A, static forces on the plate include nominally equal and symmetric field forces about each of the four equally spaced-apart magnets 50. With the exemplary field forces having components parallel with the axis, A, and directed toward the support base 34, the gimbaled plate 18 and the support base 34 are held apart by the base shaft 36. This symmetry in the system 16 enables yaw rotation (e.g., only in the plane P) and can facilitate limiting the rotation to be with the plane P of the plate parallel to the plane B of the support base 34, i.e., without pitch or roll rotation. On the other hand, FIGS. 3C, 3D, 9A and 9B illustrate imparting a non-symmetric distribution of forces to tilt the gimbaled plate 18 with respect to the support base 34 while the gimbaled plate 18 and the support base 34 are held apart by the shaft 36.

Figure 5B:
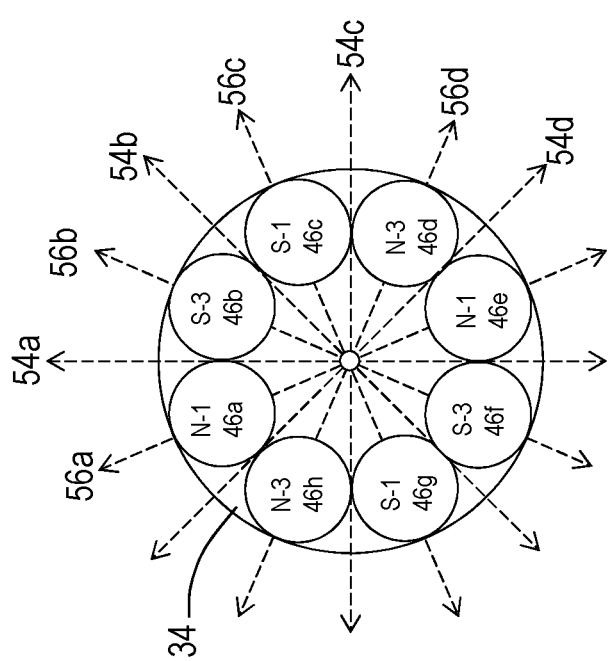
Figure 6C:
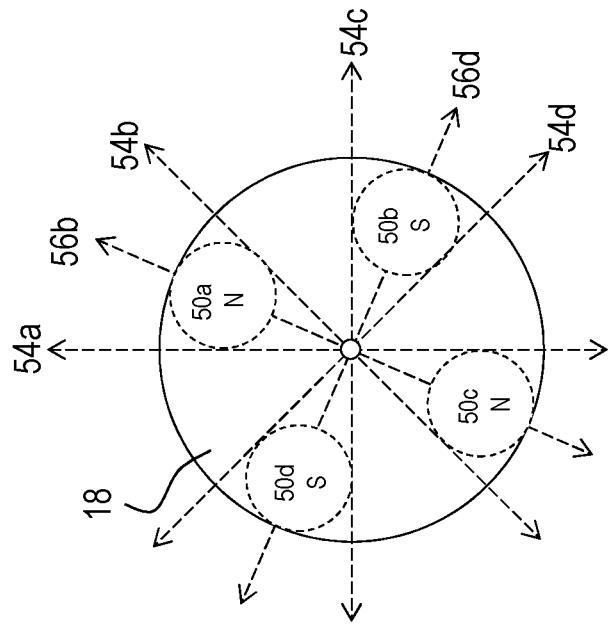

FIG. 6C illustrates a second in the sequence of interim plate 18 positions in a sequence of positions to cumulatively rotate the gimbaled plate 18 ninety degrees. Rotation to the second position is accomplished with application of a second set of coil field configurations defined by the set of coil field specifications in FIG. 5B, followed by application of a third set of coil field specifications in FIG. 5C. The second set of coil field patterns creates a second set of force fields according to the field pole vector [N-1,S-3,S-1,N-3,N-1,S-3,S-1,N-3]. This causes each permanent magnet to initially move from the previously stable first position of FIG. 6A toward a plane 56. Next, the third set of coil field patterns creates a third set of force fields according to the field pole vector [0,S-2,0,N-2,0,S-2,0,N-2] to complete the first interim rotation of the gimbaled plate 18 to the second neutral position shown in FIG. 6C. As a result, the central axis of each permanent magnet 50*a* and 50*c* is in the plane 56*b*, and the central axis of each permanent magnet 50*b* and 50*d* is in the plane 56*d*.

When the second set of coil field specifications, described in FIG. 5B, is applied, the field strengths generated with the second magnet in each Da pair (i.e., the coil magnets 40*b*, 40*d*, 40*f*, and 40*h*) are increased from magnitude 2 to magnitude 3. At the same time, for the first magnet in each Da pair (i.e., the coil magnets 40*a*, 40*c*, 40*e*, and 40*g*), the pole orientation is reversed and field strength is reduced from magnitude 2 to magnitude 1. Magnet 50*a* experiences a relatively large attraction to 46*b* with a relatively small repelling force from 46*a*. The resulting field force helps rotate the plate 18 clockwise from the first position shown in FIG. 6A. The rotation may be initiated with other modifications to the coil field values. An alternative configuration to FIG. 5B, in order to rapidly initiate movement of the permanent magnet 50*a* from the position in FIG. 6A to directly over the coil 46*b*, as in FIG. 6C, maintains magnet 46*b* at least at the field value S-2 but, as shown in the example field specification of FIG. 5B, the strength may be increased to the field value S-3. At the same time, the field value of coil 46*a* is reduced or reversed relative to the field value of magnet 46*b*, e.g., to the field value S-1.

Figure 5C:
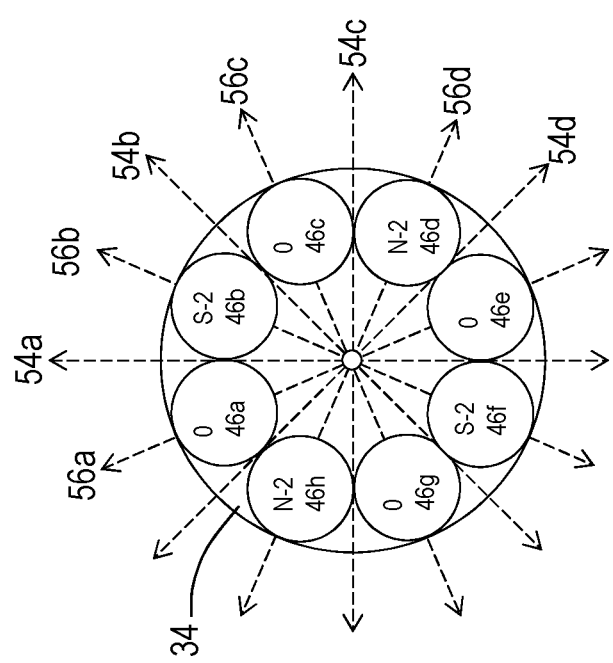
Figure 6F:
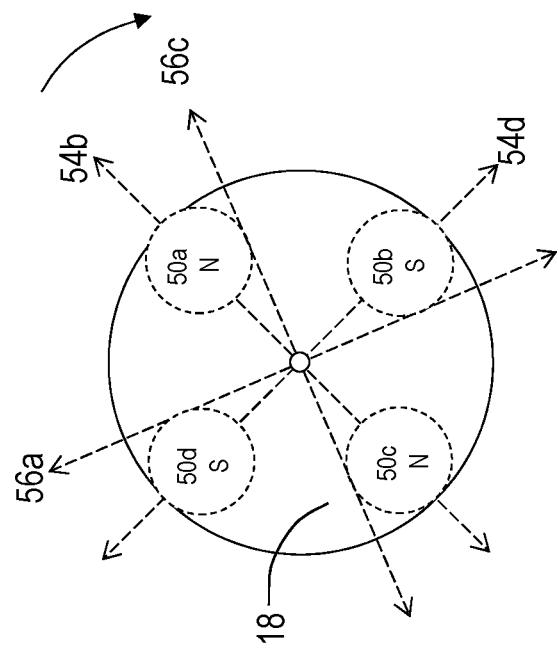

In the example coil field specification of FIG. 5B, the field pole orientation of magnet 46*a* is reversed to N, with at least a field magnitude 1. By so reversing the field value to N-1, the magnet 50*a* is nudged in a clockwise direction with a repelling force resulting from like field polarities associated with the magnet 50*a* and the coil 46*a*. At the same time, the magnet 50*a* is also pulled in the clockwise direction by an attracting force resulting from an opposite field polarity associated with the coil magnet 46*b*. After developing initial movement with these force fields, the third set of coil field specifications shown in FIG. 5C is applied to further rotate the plate 18 and stabilize the plate at the second position shown in FIG. 6C. As described in FIG. 5C, the field values applied according to the third set of coil field specifications decrease the field strength of magnets 40*b*, 40*d*, 40*f*, and 40*h* from magnitude 3 to magnitude 2 (e.g., S-2 for coil 46*b*) while the fields for the coils 40*a*, 40*c*, 40*e*, and 40*g* are turned off, shown as 0 in FIG. 5C. As a result, magnet 50*a* is moved from a position equidistant from coils 46*a* and 46*b* to that shown in FIG. 6*c*, centered in the plane 56*a* and positioned above the coil 46*b*.

Noting, however, the characteristic nonlinear decay in field strength as a function of distance, field values of the coils 46*a*, 40*c*, 40*e*, and 40*g* may, instead of being reduced to zero, simply be low values (e.g., a field value S-1) relative to the field values of coils 46*b*, 40*d*, 40*f*, and 40*h* (e.g., a field value S-2). In any such embodiment, when the field values of the coils 46*a*, 40*c*, 40*e*, and 40*g* are low relative to the field values of the coils 46*b*, 40*d*, 40*f*, and 40*h*, each of the permanent magnets 50 may experience the continued movement into a plane 56. Specifically, the field magnitudes generated according to the third set of coil field specifications cause each permanent magnet 50 to move to a relatively low energy state which coincides with positioning the axis of symmetry of each permanent magnet 50 in one of the planes 56*b* or 56*d*.

In other embodiments a coil field specification may create a set of field magnitudes that cause each permanent magnet 50 to move to a relatively low energy state which does not coincide with positioning the axis of symmetry of each permanent magnet 50 in one of the planes 56. For example, after initiating rotation according to the second set of coil field specifications, the third set of coil field specifications may generate field strength magnitudes for coils 46*a*, 40*c*, 40*e*, and 40*g* which are lower than, but relatively close to, the field strength magnitudes of the coils 46*b*, 40*d*, 40*f*, and 40*h*, having an influential force on the permanent magnets 50. For example, the third set of coil field patterns may create a third set of force fields according to the field pole vector [S-2,S-3,N-2,N-3,S-2,S-3,N-2,N-3] to complete an interim rotation of the gimbaled plate 18 that is less than 22 1/2 degrees, to a neutral plate position.

With FIG. 5C illustrating a third set of force fields according to the field pole vector [0,S-2,0,N-2,0,S-2,0,N-2], at the same time the magnet 50a is moved to be centered in the plane 56b, the magnet 50c is moved to also be centered in the plane 56b, except positioned above coil 46f, similar to the preceding description for effecting movement of magnet 50a. At the same time, but with polarities reversed, magnet 50b moves, from a position equidistant from magnets 46c and 46d, to be centered in plane 56d, positioned above coil 46d, and magnet 50d moves from a position equidistant from coils 46g and 46h to be centered in plane 56d above coil 46h.

To arrive at the example gimbaled plate configuration shown in FIG. 6C, the coil fields transition from the polarity vector for FIG. 5A, which created the neutral position of FIG. 6A, to a motion-inducing transitional field pole vector for FIG. 5B, initiating clockwise movement, and then to a stabilizing field pole vector for FIG. 5C for a neutral (non-motive) plate position in a plane 22½ degrees from the first plate position shown in FIG. 5A. To summarize the principles by which rotation to a neutral gimbaled plate position may be completed, e.g., as shown in FIGS. 6C, 6E, and 6G: the difference in field strength between magnets in each pair of adjacent coils may be increased, thereby increasing the relative force generated by every other coil in the sequence about the path C1. The permanent magnets each become predominantly attracted toward the one coil in a pair that generates the stronger field of opposite polarity to the permanent magnet. This results in rotation of 22½° to the second neutral position of FIG. 5C in the sequence, further rotation by 22½° to the third neutral position of FIG. 5E in the sequence, and further rotation by 22½° to the fourth neutral position of FIG. 5G in the sequence.

FIG. 6E illustrates a third in the sequence of interim plate 18 positions to rotate the gimbaled plate 18 a cumulative ninety degrees. Rotation from the second position of FIG. 6C to the third position of in FIG. 6E, is accomplished with application of a fourth set of coil field patterns based on field coil specifications in FIG. 5D followed by application of a fifth set of patterns based on coil field specifications in FIG. 5E.

The fourth set of coil field patterns in FIG. 5D creates a fourth set of force fields according to the field pole vector [N-3,S-1,S-3,N-1,N-3,S-1,S-3,N-1]. This marks a transition between coils pairs Da and Db in which coils in different pairs facilitate nudging a permanent magnet into a plane 54, i.e., causing each permanent magnet to initially move from the previously stable second position of FIG. 6C toward a plane 54. For example, with coil magnet 46a having a strength N-3 and coil magnet 46c having a strength S-3, the permanent magnet 50a is nudged toward the plane 54b. Next, the fifth set of coil field patterns in FIG. 5E, defined by the field pole vector [N-2,S-2,S-2,N-2,N-2,S-2,S-2,N-2], creates a fifth set of force fields to complete the second interim rotation and create the neutral gimbaled plate position shown in FIG. 6E. As a result, the central axis of each permanent magnet 50a and 50c is in the plane 54b, and the central axis of each permanent magnet 50b and 50d is in the plane 54d.

Referring to the coil field specifications of FIG. 5D, a feature of the invention is creation of a spatial differential in field magnitudes between adjacent coils in a pair having like pole orientation. In some embodiments the field differential is based on changing the pole orientation between the adjacent coils in the pair. As a result of the spatial differential in field magnitudes, the plate 18 receives a rotational force followed by application of a field pole vector which places the plate in a neutral predetermined position.

Fields generated with the fourth set of coil field specifications result in a reduction in field magnitudes of the coil magnets 46b, 46d, 46f and 46h from magnitude 2 to magnitude 1. This reduces attractive forces between these coil magnets and the permanent magnets 50. At the same time, fields generated with the fourth set of coil field specifications result in an increase in field magnitudes generated with the coil magnets 46a, 46c, 46e and 46g from magnitude 2 to magnitude 3. Thus the field pole vector results in differential forces generated among pairs of adjacent coil magnets. For example, the force between magnet 50a and coil magnet 46c is greater than the force between magnet 50a and coil magnet 46b. Consequently, the magnet 50a is pulled in the clockwise direction by the greater force resulting from opposite field polarities associated with the magnet 50a and the coil 46c. The cumulative effect of the differences in levels of force between adjacent coil magnets in each of the pairs (46b, 46c), (46d, 46e), (46f, 46g), (46h, 46a) and the permanent magnets 50a, 50b, 50c, 50d initiates clockwise plate rotation toward the position shown in FIG. 6E. The plate rotation may be initiated with other modifications to coil field values based on concepts and variations such as those described for the second position.

After developing initial movement toward the third position, an application of another set of input signals 32, develops the fifth set of coil field patterns specified in FIG. 5E based on the field pole vector [N-2,S-2,S-2,N-2,N-2,S-2,S-2,N-2]. Accordingly, each permanent magnet 50 experiences attractive forces of equal magnitude that stabilize the plate in the third neutral gimbaled plate position shown in FIG. 6E. With reference to the coil field specification of FIG. 5E, another feature of the invention is a shift in pairing from coils pairs Da to coil pairs Db to complete interim rotations and create neutral plate positions. Noting that the set of field coil configurations for the first field plate position is based on the pole vector SSNNSSNN (clockwise about the path $C_1$) illustrated in FIG. 5A, the set of field coil configurations for the third position (FIG. 6E) created by the field generation circuitry 28 is based on a clockwise shift in this pole vector by one coil magnet 46. This results in the pole vector NSSNNSSN which provides the neutral configuration of the third plate position and corresponds to the following clockwise pairing about the path $C_1$: 46b,46c; 46d,46e; 46f,46g; and 46h,46a.

Members within each pair of adjacent coils in the series (i.e., (46b, 46c), (46d, 46e),(46f, 46g), (46h, 46a)) have like field poles facing the gimbaled plate 18 while adjacent pairs of coils in the series have poles of the alternate type facing the gimbaled plate 18. For example, pair (46b, 46c) has poles S facing the plate 18 while the adjoining pair (46d, 46e) has poles N facing the plate 18. Although pole orientation and field direction alternate from coil pair to coil pair, all coil fields have substantially identical patterns of the same magnitude so that field interactions can generate the same force with respect to each permanent magnet.

For the fifth set of coil patterns, the adjacent magnets 46b, 46c are first and second adjoining magnets in a first pair, energized to create field components having poles S facing the gimbal plate 18; magnets 40d and 40e are first and second adjoining magnets in a second pair, energized to create field components having poles N facing the gimbal plate 18; magnets 40f and 40g are first and second adjoining magnets in a third pair, energized to create field components having poles S facing the gimbal plate 18; and magnets 40h and 40a are first and second adjoining magnets in a fourth pair, energized to create field components having poles N facing the gimbal plate 18. With the pole orientation between pairs of coil magnets alternating, the coil field patterns complement the alternating pole sequence of the permanent magnets along the path $C_2$. This causes each permanent magnet 50 to be predominately attracted by one pair of coil magnets on the support base 34 to occupy the third neutral position shown in FIG. 6E. In the third position the cylindrical axis of symmetry of each of the permanent magnets 50 is in one of the four planes 54a, 54b, 54c or 54d that passes midway between two pairs of coil magnets diametrically opposite one another. The magnets 50a and 50c are centered about the plane 54b, and the magnets 50b and 50d are centered about the plane 54d.

With operation of the gimbaled plate 18 according to the field coil specifications of FIG. 5E, movement of the magnets 50a-50d to bring the plate 18 to the third position is predominantly influenced by attractive forces associated with like fields generated by proximate pairs of coils 46. This causes each permanent magnet to move to and remain centered in one of the planes 54b or 54d, i.e., positioned midway between adjacent coils in a pair.

For the permanent magnet 50a, having the pole N facing the support base 34, each in the pair of adjacent coils 46b and 46c is energized to create two adjoining coil poles S facing the plate 18, with each pole S having an associated field magnitude of 2. The cylindrical axis of symmetry of the permanent magnet 50a is then centered in the plane 54b, positioned midway between the coils 46c and 46d and, relative to the reference plane RP, above coils 46c and 46d.

With the pole S of permanent magnet 50b facing the support base 34, each in the pair of adjacent coils 46d and 46e is energized to create two adjoining coil poles N facing the plate 18, with each pole N having an associated field magnitude of 2. The axis of symmetry of the cylindrically shaped permanent magnet 50b is then centered in the plane 54d, positioned midway between the coils 46d and 46e and, relative to the reference plane RP, above coils 46d and 46e.

With the pole N of permanent magnet 50c facing the support base 34, each in the pair of adjacent coils 46f and 46g is energized to create two adjoining coil poles S facing the plate 18, with each pole S having an associated field magnitude of 2. The axis of symmetry of the cylindrically shaped permanent magnet 50c moves into the plane 54b, positioned midway between the coils 46f and 46g and, relative to the reference plane RP, above coils 46f and 46g.

With the pole S of permanent magnet 50d facing the support base 34, each in the pair of adjacent coils 46h and 46a is energized to create two adjoining coil poles N facing the plate 18, with each pole N having a field magnitude of 2. With this arrangement the axis of symmetry of the cylindrically shaped permanent magnet 50d is then centered in the plane 54d, midway between the coils 46h and 46a and, relative to the reference plane RP, above coils 46h and 46d.

Figure 5F:
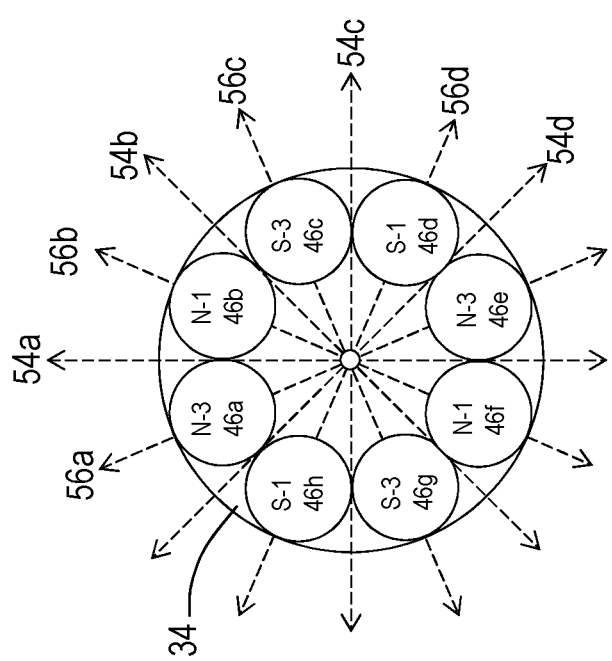
Figure 5H:
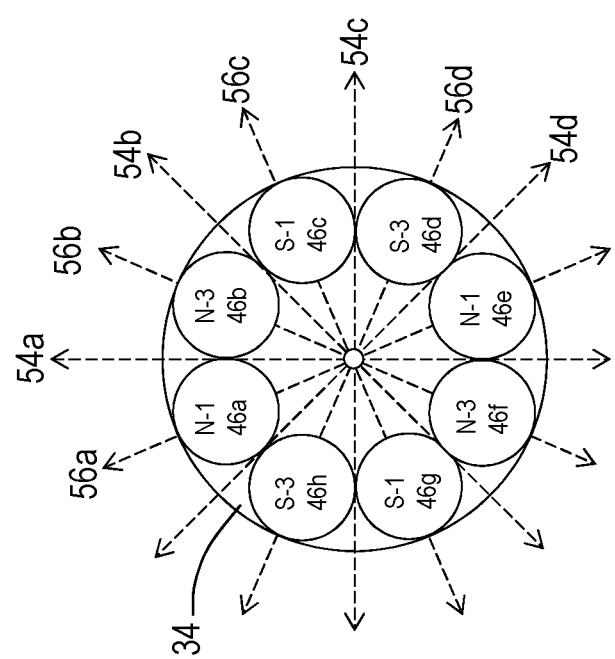

FIG. 6G illustrates a fourth interim position to continue the ninety degree plate rotation with another exemplary 22½ degree increment with application of a sixth set of coil field patterns according to field coil specifications shown in FIG. 5F, followed by application of a seventh set of coil field patterns based on field coil specifications shown in FIG. 5G.

The sixth set of coil field patterns creates a sixth set of force fields according to the pole vector [N-3,N-1,S-3,S-1, N-3,N-1,S-3,S-1]. This causes each permanent magnet to initially move from the previously stable second position of FIG. 6E toward a plane 56. Next, the seventh set of coil field patterns, defined by the pole vector [N-2,0,S-2,0, N-2,0,S-2,0], creates another change in field coupling between the coils 46 and permanent magnets 50, this providing a seventh set of force fields to complete the 22 1/2 degree interim rotation to the fourth neutral plate position. As a result, the central axis of each permanent magnet 50a and 50c is in the plane 56c, and the central axis of each permanent magnet 50b and 50d is in the plane 56a.

With reference to the fifth coil field specifications shown in FIG. 5E, when the sixth set of coil field specifications described in FIG. 5F are applied, the field strengths generated with the coil magnets 46a, 46c, 46e, and 46g are increased from magnitude 2 to magnitude 3. At the same time, for each coil magnet 46b, 46d, 46f, and 46h, the pole orientation is reversed and the field strength is reduced from magnitude 2 to magnitude one. This rotates the plate 18 clockwise from the third position shown in FIG. 6E. However, as discussed for other interim rotations, rotation to the fourth position may be initiated with other modifications to the coil field values.

In order to begin movement of the permanent magnet 50a to a position directly over the coil 46c, coil 46c can be maintained at least at the field value S-2 but, as shown in the example field specification of FIG. 5F, may be increased to the field value S-3. At the same time, the field value of coil 46b is reduced or reversed relative to the field value of coil magnet 46c (e.g., reduced to the field value S-1). In relation to the coil field specifications shown in FIG. 5E, the field pole orientation of magnet 46b is reversed to N, with at least a field magnitude 1. By so reversing the field value of coil 46b to N-1, the magnet 50a is nudged in a clockwise direction with a repelling force resulting from like field polarities associated with the magnet 50a and the coil 46b. At the same time, the magnet 50a is also pulled in the clockwise direction by an attracting force resulting from an opposite field polarity associated with the coil 46c. After initiating movement with these force fields, the seventh set of coil field specifications is applied to further rotate the plate 18 to the neutral position shown in FIG. 6G. As described in FIG. 5G, the field values applied according to the seventh set of coil field specifications decrease the field strength of the coils 46a, 46c, 46e, and 46g from magnitude 3 to magnitude 2 (e.g., S-2 for coil 46c) and the fields for the coils 46b, 46d, 46f, and 46h are turned off. As a result, magnet 50a is moved from a position midway between coils 46b and 46c to be centered in the plane 56c and below the coil 46c.

Again noting the characteristic nonlinear decay in field strength as a function of distance, field values of the coils 46b, 46d, 46f, and 46h may, instead of being reduced to zero, simply be low values (e.g., the field value S-1) relative to the field values of coils 46a, 46c, 46e, and 46g (e.g., the field value S-2). In any such embodiment, when the field values of the coils 46b, 46d, 46f, and 46h are low relative to the field values of the coils 46a, 46c, 46e, and 46g, each of the permanent magnets 50 may experience the afore described continued movement into a plane 56. Specifically, the field magnitudes generated according to the seventh set of coil field specifications cause each permanent magnet 50 to move to a relatively low energy state which coincides with positioning the axis of symmetry of each permanent magnet 50 in one of the planes 56a or 56c. As described for the second neutral position (see FIGS. 5C and 6C), in other embodiments a third set of coil field magnitudes may cause each permanent magnet 50 to move to a relatively low energy state by generating field strength magnitudes for coils 46b, 40d, 40f, and 40h lower than, but relatively close to, the field strength magnitudes of the coils 46a, 40c, 40e, and 40g, to create a stable plate position with an interim rotation less than 22 1/2 degrees.

With the illustrated embodiment having the seventh set of force fields according to the pole vector [N-2,0,S-2,0, N-2, 0,S-2,0], at the same time the magnet 50*a* is moved to be both centered in the plane 56*c* and below the coil 46*c*, the magnet 50*c* is moved to also be centered in the plane 56*c* and positioned below coil 46*g*. At the same time, but with field poles reversed, magnet 50*b* is moved from a position midway between coils 46*d* and 46*e* to be centered in the plane 56*a* and positioned below coil 46*e*, and magnet 50*d* is moved from a position midway between coils 46*h* and 46*a* to be centered in the plane 56*a* below coil 46*a*.

In summary, as described for the plate position shown in FIG. 6C, to arrive at the example position shown in FIG. 6G, the coil fields are transitioned from the polarity vector which created the neutral position of FIGS. 5E and 6E to a motion-inducing transitional field pole vector, creating an initial clockwise motion, and then to a stabilizing field pole vector for a neutral (non-motive) configuration in a plane 22½ degrees from the earlier position.

Figure 6H:
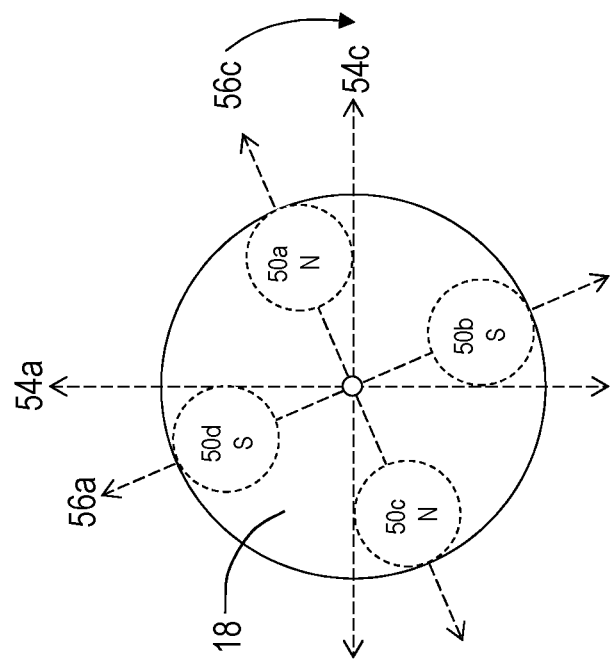
Figure 6I:
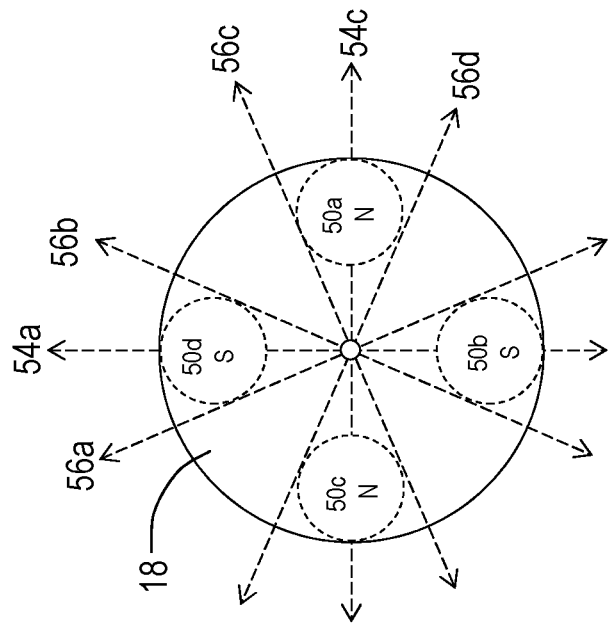

FIG. 6I illustrates a fifth in the sequence of interim positions for the ninety degree plate rotation based on a final exemplary 22 1/2 degree increment. An eighth set of coil field patterns is applied according to the coil field specifications shown in FIG. 5H, followed by application of a ninth set of coil field patterns based on the coil field specifications shown in FIG. 5I. When the eighth set of coil field patterns is generated, the change in field coupling, relative to the coil field specification shown in FIG. 5G, creates an eighth set of force fields according to the pole vector [N-2,0,S-2,0, N-2, 0,S-2,0]. The field interaction between magnets 46 and permanent magnets 50 causes a force against magnets 50, initiating the final interim rotation of the plate 18, from the fourth stable position of FIG. 6G toward the fifth position shown in FIG. 6I.

Figure 5I:
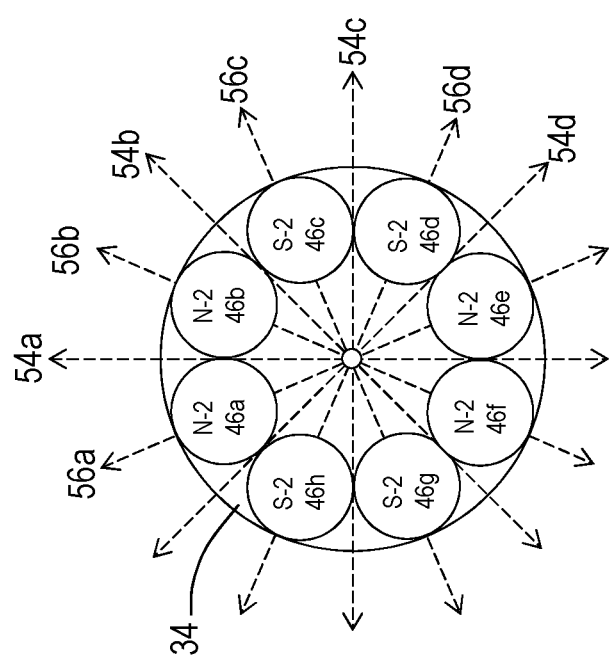

Next, a ninth set of coil field patterns, generated as specified in FIG. 5I, creates another change in field coupling between the coils 46 and permanent magnets 50. This results in a ninth set of force fields according to the field pole vector [N-1,N-3,S-1,S-3, N-1,N-3,S-1,S-3], causing a force against each magnet 50 to complete the rotation to the fourth neutral plate position shown in FIG. 6I. This completes a ninety degree rotation of the gimbaled plate 18.

Figure 8F:
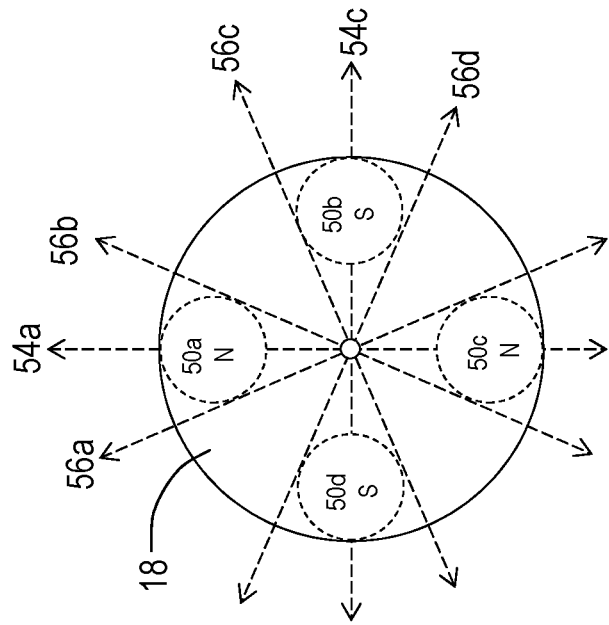
FIG. 8F illustrates an exemplary 360 degree position of rotation, relative to the position shown in FIG. 6A.

Further plate rotations beyond the illustrated ninety degree range can be had from the plate position shown in FIG. 6I. For example, a rotation from the ninety degree position shown in FIG. 6I to a 180 degree position shown in FIG. 8D is effected with eight sets of coil field specifications shown in FIGS. 7A through 7H. FIGS. 8A, 8B and 8C illustrate 22½ degree interim positions of rotation generated with the field sets. Rotation to the position shown in FIG. 8A results from sequential application of coil field specifications shown in FIGS. 7A and 7B. Rotation to the position shown in FIG. 8B results from sequential application of coil field specifications shown in FIGS. 7C and 7D. Rotation to the position shown in FIG. 8C results from sequential application of coil field specifications shown in FIGS. 7E and 7F. Rotation to the position shown in FIG. 8D results from sequential application of coil field specifications shown in FIGS. 7G and 7H.

Figure 8E:
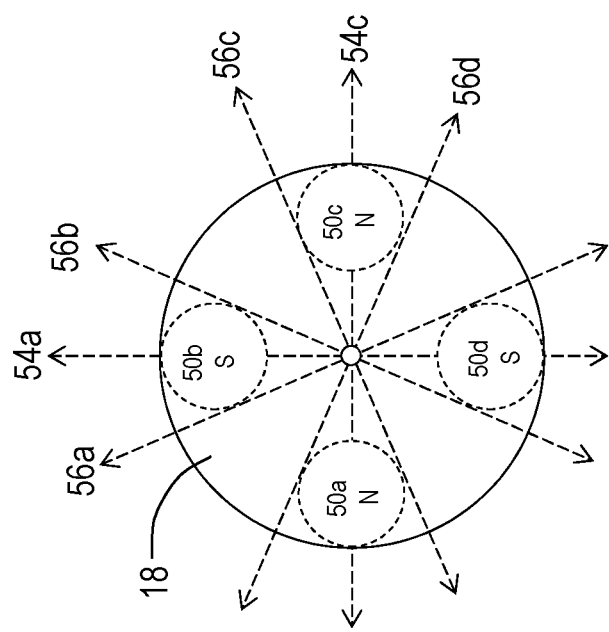
FIG. 8E illustrates an exemplary 270 degree position of rotation, relative to the position shown in FIG. 6A.

A rotation beyond the 180 degree position shown in FIG. 8D, e.g., to the 270 degree position shown in FIG. 8E, is achieved by applying the set of field patterns shown in FIGS. 5A through 5I in a like manner to that which provides the ninety degree rotation of FIG. 6I. Rotation beyond the 270 degree position of rotation shown in FIG. 8E, e.g., to the 360 degree position, equivalent to the initial zero degree position shown in FIG. 6A, is achieved by applying the same set of field patterns shown in FIGS. 7A through 7I in a like manner to that which provides the ninety degree clockwise rotation from the position of FIG. 6I. Ranges beyond the 360 degree position are achieved by repeating application of sets of field patterns.

From the foregoing it will be apparent that a gimbal adjustment system according to embodiments of the invention can operate with a variety of sets of coil field specifications to achieve incremental rotations of arbitrary range. The adjustment processing circuitry 24, the algorithm 25 and the field generation circuitry 28 can be configured to generate position displacements on a continuum rather than according to discrete increments. As noted, relative magnitudes assigned to adjacent members in coil pairs can be varied to establish a relatively low energy state for each of the magnets 50 at desired positions along a continuum.

Pitch and roll rotations of the gimbaled plate 18 (collectively, tilt) results from generating components of force fields in directions parallel to the axis A without symmetrically balancing the forces about the axis. Referring to the corresponding plate position of FIG. 6A, FIG. 9A defines a set of first coil field tilt specifications according to the field vector [S-1,S-1,0,0,N-1,N-1,0,0]. In contrast to the coil field specifications in FIG. 5A, the set of coil field specifications shown in FIG. 9A generates field forces on opposing sides of the plane 54*c* shown in FIGS. 6A and 7A to tilt the gimbaled plate 18 as shown in FIG. 3C. The forces impart (i) a downward movement, toward the support base 34, of both the permanent magnet 50*a* and the portion of the plate positioned on the same side of the plane 54*c* as the magnet 50*a*; and (ii) an upward movement, away from the support base 34, of both the permanent magnet 50*c* and the portion of the plate positioned on the same side of the plane 54*c* as the magnet 50*c*.

Again referring to the corresponding plate position of FIG. 6A, FIG. 9B defines a second coil field tilt specification according to the field vector [0,0,N-1,N-1,0,0, S-1,S-1]. This generates field forces on opposing sides of the plane 54*a* shown in FIGS. 6A and 7B, tilting the gimbaled plate 18 as shown in FIG. 3D. This results in (i) a downward movement, toward the support base 34, of both the permanent magnet 50*d* and the portion of the plate positioned on the same side of the plane 54*a* as the magnet 50*d*; and (ii) an upward movement, away from the support base 34, of both the permanent magnet 50*b* and the portion of the plate positioned on the same side of the plane 54*a* as the magnet 50*b*. See FIG. 8B and the side view of the gimbal adjustment system shown in FIG. 3D.

The exemplary field specifications for introducing plate tilt are based on applying the same limited number of discrete field magnitudes 0, 1, 2 and 3 for rotation in the plane P. However, systems that control operation of the gimbal adjustment system 16 can provide finer adjustments in field magnitudes for precision positioning over a range of angles. Use of field magnitudes in combination with feedback control provided by the OIS system 4 enables small angle adjustment in plate positions and balancing of force field components to stabilize the gimbaled plate 18 at a desired angle of rotation. Potentially, angular positions and displacements can be achieved with resolutions of less than 0.1 degree. This capability also facilitates rapid adjustment and balancing of forces over a large range of angles to stabilize the plate 18 in multiple orthogonal directions.

Illustrated embodiments of the gimbal adjustment system incorporate alternating magnet polarity to increase torque and reduce position ambiguity. The OIS system can be programmed to reset the module to a predefined position such as shown in FIG. 3A. By continuously varying field magnitudes the camera unit 6 can undergo smooth movements. The entire camera may be gimbaled or a component, such as the lens, may be fixed, while another component, such as the sensor array, is gimbaled for controlled movement.

Current levels of the signal values 32i can continuously vary based on data received from the plate position sensor module 19 (determinative of camera position) and the displacement and adjustment information received from the indicative of the uncontrolled motion. When change of device orientation is persistent the control module can reset the camera orientation to be parallel with a device surface as shown in FIG. 3A. Otherwise, the OIS system 4 can retain the camera unit in a fixed orientation relative to an imaging region despite uncontrolled movement of the device 2.

In addition to providing for yaw rotation in the plane, P, the disclosed OIS system offers greater freedom of camera movement because there is no mechanical connection between the camera components and an actuator. Such prior systems for countering movement have shifted the image, e.g., in the plane of the sensor, to provide stabilization, but this is known to introduce changes in perspective. The disclosed OIS systems do not introduce changes in perspective.

A gimbaled plate has been illustrated as a component on which a camera component or the entire camera unit is mounted. In other embodiments, the gimbaled plate may be an integral part of the imaging unit, such as a bottom surface of the enclosure of the camera unit (see FIG. 3B), along which the image sensor 12 is positioned. The support base 34 has been illustrated as a discrete component having a fixed orientation with respect to the plane B or a surface such as the surface 8 of the device 2. Generally, the support base 34 is a structure having a fixed position with respect to a plane (e.g., plane B), and having a surface along which magnetic elements are positioned for field coupling with magnetic elements positioned along the gimbaled plate.

Embodiments of the invention enable optical image stabilization based on controlled rotation of a gimbaled imaging device with magnetic fields. More generally, in one series of embodiments a method is provided for adjusting an object positioned on a plate and rotatable about a pivot with one, two or three degrees of freedom. A structure, such as a base plate, is provided fixed in position with respect to a reference plane. The plate is connected to the structure with an attachment joint permitting the plate to rotate about a point with respect to the reference plane with one, two or three degrees of freedom while the structure is not rotatable. A first group of magnetic elements is provided for movement with the plate, with some of the elements oriented to direct a first series of magnetic field patterns toward a surface of the structure. A second group of magnetic elements is provided along the surface of the structure, with elements oriented to direct a second series of magnetic field patterns for interaction with the magnetic field patterns in the first series. Magnitudes or directions of field patterns in at least one of the two series are controlled to interact with field patterns in the other series, causing motion of both the first plurality of magnetic elements and the plate.

In another series of embodiments a gimbaled adjustment system includes a base, a plate including a lower portion connected to the base, a shaft, attached to the base and multiple magnetic elements. The shaft extends away from the base and includes a pivot attached to the plate. The pivot and a portion of the plate lower surface form a joint which permits the plate to rotate about the pivot. The multiple magnetic elements include a first series of magnetic elements and a second series of magnetic elements. Magnetic elements in the first series are positioned on the base to provide a first plurality magnetic field patterns extending toward the plate. Magnetic elements in the second series are attached for movement with the plate to provide a second plurality of magnetic field patterns extending toward the base. Magnetic field patterns associated with multiple magnetic elements cause the plate to be rotated about the joint or stabilized about the joint.

In another series of embodiments a gimbal adjustment system includes a base, a plate including a lower portion connected to the base, a shaft attached to the base, multiple magnetic elements and an optical unit. The shaft extends away from the base and includes a pivot attached to the plate. The pivot includes a point of contact with a portion of the plate lower surface. A joint comprises the pivot and the portion of the lower plate surface about which the plate is rotatable about the pivot. The magnetic elements are positioned on the base and the plate to selectably couple magnetic fields to stabilize the plate or to rotate the plate about the joint with one, two or three degrees of freedom. The optical unit comprises a lens, attached to the plate. The combination, comprising at least the plate, the optical unit and magnetic elements positioned on the plate, form a gimbaled assembly having a characteristic center of mass in the joint with the gimbaled assembly rotatable about the pivot point of contact. In one such embodiment the method includes attaching an imaging unit to the plate to form a gimbaled assembly comprising at least the imaging unit, the plate and the first plurality of magnetic elements, where the center of mass of the gimbaled assembly coincides with the attachment joint.

There are also provided embodiments of an optical image stabilization system in which a surface occupies a fixed position with respect to a first reference plane, an Inertial Measurement Unit (IMU), a gimbaled plate and an imaging unit. The IMU is coupled to provide velocity or acceleration data determinative of changes in roll rotation, pitch rotation and yaw rotation along the surface. The gimbaled plate extends along a second plane and is connected to the surface with an attachment joint permitting the plate to rotate about a point with respect to the first reference plane with one, two or three degrees of freedom while the surface does not rotate with respect to the first reference plane. The system also includes a first plurality of magnetic elements coupled for movement with the plate and oriented to direct a first series of magnetic field patterns toward the surface, and a second plurality of magnetic elements positioned along the surface and oriented to direct a second series of magnetic field patterns for interaction with the magnetic field patterns in the first series. Circuitry provides signal values to multiple magnetic elements based on the velocity or acceleration data to cause magnetic coupling between (a) multiple field patterns in the first series and (b) multiple field patterns in the second series. This coupling causes motion of the imaging unit to limit motion due to changes in roll rotation, pitch rotation or yaw rotation.

Embodiments of methods are provided for limiting uncontrolled movement of a gimbaled imaging unit attached to a structure. In one embodiment position data are determined for the gimbaled imaging unit. Acceleration or movement data are acquired for the structure. The data are applied to calculate yaw, pitch and roll adjustment values for the gimbaled imaging unit. Magnetic field components are calculated for yaw, pitch and roll rotations that limit movement of the imaging unit. The field components are combined to create sets of adjustment values. Control signal adjustment values are created to drive a series of coil magnets for field coupling with other magnets to limit movement of the imaging unit.

Embodiments of methods are also provided for generating movements in a gimbaled plate to stabilize an imaging unit. In an embodiment the imaging unit is attached to a series of permanent magnets. The imaging unit and the permanent magnets are attached to a support structure for rotation about a joint. A series of coil magnets is positioned on the support structure. The coil magnets are driven with a sequence of input signals to generate time varying field configurations for interaction with fields of the permanent magnets to create a set of motive forces that counter uncontrolled rotational movements of the support structure to limit movements of the imaging unit.

Example embodiments of the invention have been illustrated in applications involving image stabilization, but the invention is not so limited. Numerous equivalents may be substituted for elements disclosed in the example systems. The invention has been described with reference to particular embodiments to provide understanding of inventive concepts and underlying principles. It will be recognized by those skilled in the art that the concepts and principles of operation can be readily extended to create control systems employing many other magnet and field configurations, providing enhanced performance and functionality to motion control. Accordingly, the scope of the disclosure is only limited by the claims which follow with each claim constituting a separate embodiment. Embodiments may combine different claims. Combinations of different embodiments are within the scope of the claims and will be apparent to those of ordinary skill in the art after reviewing this disclosure.

The claimed invention is:

1. A gimbaled adjustment system comprising:
a base;
a plate including a lower portion connected to the base;
a shaft, attached to the base, the shaft extending away from the base and along a central axis, with the shaft including a pivot attached to the plate, the pivot and a portion of the plate lower surface forming a joint which permits the plate to rotate about the pivot;
multiple magnetic elements including a first series of magnetic elements and a second series of magnetic elements, with magnetic elements in the first series positioned on the base to provide a first plurality of magnetic field patterns each extending toward the plate and with magnetic elements in the second series attached for movement with the plate to provide a second plurality of magnetic field patterns extending toward the base, where (i) magnetic field patterns associated with multiple ones of the magnetic elements cause the plate to be rotated about the joint or stabilized about the joint; and (ii) field patterns associated with magnetic elements in the first series are controllable to generate forces to rotate the plate about the pivot with multiple degrees of freedoms, including rotation of the plate along a plane and around the central axis.

2. The adjustment system of claim 1 wherein field patterns associated with magnetic elements in the first series are controllable to generate forces to rotate the plate about the pivot with at least two degrees of freedom.

3. The adjustment system of claim 1 where field patterns associated with magnetic elements in the first series are controllable to generate forces to rotate the plate about the pivot with three degrees of freedom.

4. The adjustment system of claim 1 where the magnetic elements include coil magnets positioned to selectively vary magnetic field patterns for magnetic coupling, causing the plate to be rotated about the pivot or stabilized about the pivot.

5. The adjustment system of claim 1 further including:
an imaging unit comprising a lens attached to the plate for movement with the plate, the adjustment system including a gimbaled assembly comprising at least the plate, the imaging unit and the second series of magnetic elements arranged for the gimbaled assembly to have a center of mass in the joint.

6. The adjustment system of claim 5 further including one or more mass elements attached to the plate lower portion, the presence of which mass elements shift the location of the center of mass of the gimbaled assembly toward a point of contact between the pivot and the plate.

7. The adjustment system of claim 6 where the one or more mass elements are spacer elements interposed between the lower plate portion and one or more of the magnetic elements in the second series.

8. The adjustment system of claim 5 configured to apply an array of time varying magnetic fields which couple with magnetic fields of the magnetic elements of the second series to create controllable Lorentz forces to the plate and thereby reduce net displacements of the lens and thereby mitigate uncontrolled motion of the plate in as many as three orthogonal directions.

9. The adjustment system of claim 1 wherein the second series of magnetic elements comprises permanent magnets positioned in fixed positions along the plate.

10. The adjustment system of claim 1 where the magnetic elements in the second series are permanent magnets arranged along a path with field poles N and S of the face the base, resulting in a sequence of alternating field poles N and S extending toward the base.

11. The adjustment system of claim 1 where the pivot is attached to a portion of the plate with a mating engagement.

12. The adjustment system of claim 1, the first series comprising at least twice as many magnetic elements as the number of magnetic elements in the second series.

13. The adjustment system of claim 1 further including circuitry to provide signal values to multiple magnetic elements based on velocity or acceleration data to cause magnetic coupling between (a) multiple field patterns in the first series and (b) multiple field patterns in the second series.

14. The adjustment system of claim 1 where, when a surface of the plate extends along a plane parallel to a surface of the base, the plate is in a level position with respect to a plane along which the surface of the base extends and the magnetic elements in the second series are oriented to direct corresponding field components having largest magnitudes predominantly along directions for coupling with field components generated by the magnetic elements in the first series.

15. The adjustment system of claim 14 configured to generate balanced forces with axially symmetric field coupling for sequential application of force fields for rotational motions of the plate out of the plane parallel to the surface of the base.

16. The adjustment system of claim 1 further including an imaging unit comprising a lens attached to the plate for movement with the plate, the lens including an optical axis co-aligned with the central axis when the plate lower surface is orthogonal to the central axis, such that field patterns associated with magnetic elements in the first series are controllable to generate forces to impart rotation of the plate along plane and around the optical axis.

17. A gimbaled adjustment system comprising:
a base;
a plate including a lower portion connected to the base;
a shaft, attached to the base, the shaft extending away from the base and along a central axis, with the shaft including a pivot attached to the plate with a ball and socket type mating engagement, the pivot and a portion of the plate lower surface forming a joint which permits the plate to rotate about the pivot;
multiple magnetic elements including a first series of magnetic elements and a second series of magnetic elements, with magnetic elements in the first series positioned on the base to provide a first plurality of magnetic field patterns each extending towards the plate and with magnetic elements in the second series attached for movement with the plate to provide a second plurality of magnetic field patterns extending toward the base, where (i) magnetic field patterns associated with multiple one of the magnetic elements cause the plate to the rotated about the joint or stabilized about the joint; and (ii) field patterns associated with magnetic elements in the first series are controllable to generate forces to rotate the plate about the pivot with multiple degrees of freedom, including roll rotation about the central axis.

* * * * *